United States Patent
Hasegawa

(10) Patent No.: US 9,426,474 B2
(45) Date of Patent: Aug. 23, 2016

(54) TRANSCODER

(75) Inventor: Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 411 days.

(21) Appl. No.: 12/995,826

(22) PCT Filed: Feb. 26, 2009

(86) PCT No.: PCT/JP2009/053499
§ 371 (c)(1),
(2), (4) Date: Dec. 2, 2010

(87) PCT Pub. No.: WO2009/147878
PCT Pub. Date: Dec. 10, 2009

(65) Prior Publication Data
US 2011/0075731 A1  Mar. 31, 2011

(30) Foreign Application Priority Data
Jun. 2, 2008  (JP) ................. 2008-144740

(51) Int. Cl.
*H04N 7/26* (2006.01)
*H04N 19/124* (2014.01)
(Continued)

(52) U.S. Cl.
CPC .......... *H04N 19/124* (2014.11); *H04N 19/146* (2014.11); *H04N 19/154* (2014.11); *H04N 19/172* (2014.11); *H04N 19/40* (2014.11); *H04N 19/61* (2014.11)

(58) Field of Classification Search
CPC .. H04N 19/44; H04N 19/176; H04N 19/186; H04N 19/30; H04N 19/597; H04N 19/187; H04N 19/46; H04N 13/0048
USPC .................................... 375/240.03
See application file for complete search history.

(56) References Cited

U.S. PATENT DOCUMENTS 6,895,050 B2 * 5/2005 Lee .......................... 375/240.03
6,993,080 B2 * 1/2006 Saunders ......... H04N 21/23424
375/240.25

(Continued)

FOREIGN PATENT DOCUMENTS

| JP | 10 075179 | 3/1998 |
| JP | 2007-300593 | 11/2007 |
| JP | 2008 42426 | 2/2008 |

OTHER PUBLICATIONS

U.S. Appl. No. 13/401,198, filed Feb. 21, 2012, Hasegawa, et al.

(Continued)

*Primary Examiner* — Chikaodili E Anyikire
*Assistant Examiner* — Kehinde O Abimbola
(74) *Attorney, Agent, or Firm* — Oblon, McClelland, Maier & Neustadt, L.L.P

(57) ABSTRACT

A transcoder that controls the amount of generated codes of an output stream toward a target bit rate without degradation of image quality. The transcoder decodes a first stream and encodes the decoded image again to thereby output a second stream. The transcoder calculates a distortion evaluation value from the image obtained by decoding the first stream and an image obtained by decoding the second stream. Assuming that a ratio between the distortion evaluation value and a total target distortion evaluation value is determined as a target distortion ratio, a target setting bit rate of a second stream in the period can be obtained by multiplying a total target bit rate of the second stream by the target distortion ratio. Alternatively, the target setting bit rate can be obtained by adjusting the target distortion ratio with an appropriate function and adding the target distortion ratio to the total target bit rate of the second stream.

28 Claims, 9 Drawing Sheets

(51) Int. Cl.
*H04N 19/172* (2014.01)
*H04N 19/61* (2014.01)
*H04N 19/146* (2014.01)
*H04N 19/154* (2014.01)
*H04N 19/40* (2014.01)

(56) References Cited

U.S. PATENT DOCUMENTS

| | | | |
|---|---|---|---|
| 7,263,126 B2 * | 8/2007 | Zhao | H04N 19/172 375/240.04 |
| 7,352,809 B2 * | 4/2008 | Wenger | H04N 7/152 348/14.1 |
| 7,453,937 B2 * | 11/2008 | Henocq et al. | 375/240.03 |
| 7,474,701 B2 * | 1/2009 | Boice | H04N 19/172 375/240.01 |
| 7,613,819 B2 * | 11/2009 | Fujii | G11B 20/10527 345/505 |
| 7,714,751 B2 | 5/2010 | Hasegawa | |
| 8,059,720 B2 * | 11/2011 | Lee | H04N 19/176 375/240.12 |
| 8,306,120 B2 * | 11/2012 | Lee et al. | 375/240.16 |
| 8,675,979 B2 * | 3/2014 | Chiba | H04N 19/176 375/240.12 |
| 8,982,963 B2 * | 3/2015 | Gish | G06T 5/50 345/590 |
| 2001/0021221 A1 * | 9/2001 | Morel | 375/240.03 |
| 2001/0033619 A1 * | 10/2001 | Hanamura et al. | 375/240.26 |
| 2002/0051494 A1 * | 5/2002 | Yamaguchi | H04N 19/51 375/240.16 |
| 2002/0136310 A1 * | 9/2002 | Saunders | H04N 21/23424 375/240.25 |
| 2002/0146072 A1 * | 10/2002 | Sun et al. | 375/240.16 |
| 2002/0168007 A1 * | 11/2002 | Lee | 375/240.03 |
| 2003/0028386 A1 * | 2/2003 | Zinser, Jr. | G10L 19/00 704/500 |
| 2004/0006644 A1 * | 1/2004 | Henocq et al. | 709/246 |
| 2004/0034864 A1 * | 2/2004 | Barrett | H04N 21/23406 725/38 |
| 2004/0179591 A1 * | 9/2004 | Wenger | H04N 7/152 375/240.01 |
| 2005/0058198 A1 * | 3/2005 | Zhao | H04N 19/172 375/240.03 |
| 2005/0117653 A1 * | 6/2005 | Sankaran | 375/240.24 |
| 2005/0147163 A1 * | 7/2005 | Li et al. | 375/240.12 |
| 2005/0175096 A1 * | 8/2005 | Lee | 375/240.03 |
| 2005/0175103 A1 * | 8/2005 | Sun et al. | 375/240.16 |
| 2005/0243911 A1 * | 11/2005 | Kwon et al. | 375/240.03 |
| 2005/0243912 A1 * | 11/2005 | Kwon et al. | 375/240.03 |
| 2005/0243913 A1 * | 11/2005 | Kwon et al. | 375/240.03 |
| 2005/0243914 A1 * | 11/2005 | Kwon et al. | 375/240.03 |
| 2005/0243915 A1 * | 11/2005 | Kwon et al. | 375/240.03 |
| 2005/0243916 A1 * | 11/2005 | Kwon et al. | 375/240.03 |
| 2005/0244063 A1 * | 11/2005 | Kwon et al. | 382/233 |
| 2005/0262531 A1 * | 11/2005 | Varma et al. | 725/35 |
| 2006/0010296 A1 * | 1/2006 | Dent | 711/147 |
| 2006/0044163 A1 * | 3/2006 | Fujii | G11B 20/10527 341/50 |
| 2006/0062292 A1 * | 3/2006 | Boice | H04N 19/172 375/240.01 |
| 2006/0133502 A1 * | 6/2006 | Lee | H04N 19/176 375/240.16 |
| 2007/0286289 A1 | 12/2007 | Arai et al. | |
| 2007/0288831 A1 * | 12/2007 | Houki | H04N 19/117 714/776 |
| 2008/0031337 A1 | 2/2008 | Hasegawa et al. | |
| 2008/0043831 A1 * | 2/2008 | Sethuraman et al. | 375/240 |
| 2008/0137753 A1 * | 6/2008 | He | 375/240.24 |
| 2008/0159400 A1 * | 7/2008 | Lee et al. | 375/240.16 |
| 2008/0232452 A1 * | 9/2008 | Sullivan et al. | 375/232 |
| 2008/0259081 A1 * | 10/2008 | Bunnell | 345/426 |
| 2009/0161769 A1 * | 6/2009 | Barrett | H04N 21/23406 375/240.25 |
| 2009/0213928 A1 | 8/2009 | Hasegawa et al. | |
| 2009/0213929 A1 | 8/2009 | Hasegawa et al. | |
| 2009/0245349 A1 * | 10/2009 | Zhao et al. | 375/240.03 |
| 2011/0032988 A1 * | 2/2011 | Chiba | H04N 19/176 375/240.12 |
| 2011/0033006 A1 * | 2/2011 | Hannes | H03F 1/3247 375/285 |
| 2011/0194618 A1 * | 8/2011 | Gish | G06T 5/50 375/240.25 |
| 2011/0274173 A1 * | 11/2011 | Ameres et al. | 375/240.16 |

OTHER PUBLICATIONS

International Search Report issued Mar. 31, 2009 in PCT/JP09/053499 filed Feb. 26, 2009.

* cited by examiner

TRANSCODER

TECHNICAL FIELD

The present invention relates to a transcoder for converting an input stream into a different output stream by decoding, and more particularly to a technique to appropriately control the amount of generated codes of the output stream toward a target bit rate.

BACKGROUND ART

Images to be delivered on digital broadcasts, those to be stored in media such as DVDs and hard disks, and the like are compressed by various coding systems. The object for such compressions is to avoid constraint on a transmission band, increase the transmission speed, decrease the memory size, or the like.

There are various standards for image coding system, such as MPEG2 and H.264. And there is a case where the coding system is converted for the purpose of reducing the amount of codes in a coded image that is inputted, or the like. A transcoder once decodes the inputted coded image. Then, the transcoder encodes the decoded image by a different coding system (or the same coding system) again. Thus, the transcoder controls a bit rate of an output stream.

The following Patent Document 1 relates to a transcoder for converting an input stream compressed by a first compressive coding system into an output stream compressed by a second compressive coding system. This transcoder acquires the degree of dispersion of an image and the degree of variation of the image in a time direction during the decoding of the input stream compressed by the first compressive coding system. By using these values as evaluation values, the transcoder calculates a quantization step value to be used for the second compressive coding.

[Patent Document 1] Japanese Patent Application Laid Open Gazette No. 2008-42426

The coded image conversion technique disclosed in Patent Document 1 aims to obtain an image of high quality from the output stream while controlling the bit rate to be a target value. In other words, a method of simply controlling the bit rate to be constant regardless of the content of an image has a possibility of causing degradation of image quality due to uniform bit allocation. By adopting the method disclosed in Patent Document 1, a large number of bits are allocated to an image which needs more bits to be allocated thereto and no superfluous bits are allocated to another image which does not need more bits to be allocated thereto.

Thus, in the technique for calculating an optimal quantization step value on the basis of information on the image obtained from the input stream, the optimal bit allocation is basically predicted from the condition of the input stream. Therefore, it can be expected to achieve further optimization if the condition of the image of the actually generated output stream is also taken into consideration.

DISCLOSURE OF INVENTION

The present invention is intended for a transcoder converting a first stream into a second stream. According to an aspect of the present invention, the transcoder comprises a part for setting a target bit rate of a whole second stream, and a target bit rate determination part for determining a target bit rate of a second stream in the (N+1) period on the basis of the target bit rate of the whole second stream, a distortion evaluation value of a second stream converted in or before the N period, and a target distortion evaluation value of the whole second stream.

It thereby becomes possible to optimally control the bit rate of the second stream toward the target bit rate without degradation of image quality.

According to another preferred embodiment of the present invention, the transcoder of the present invention comprises a part for setting a target bit rate of a whole second stream, and a target bit rate determination part for determining a target bit rate of a second stream in the (N+1) period on the basis of the target bit rate of the whole second stream, a bit rate and a distortion evaluation value of a second stream converted in or before the N period, a target bit rate of a second stream in the N period, and a target distortion evaluation value of the whole second stream.

Therefore, it is an object of the present invention to appropriately control the amount of generated codes of an output stream toward a target bit rate while maintaining high quality of the image of the output stream.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
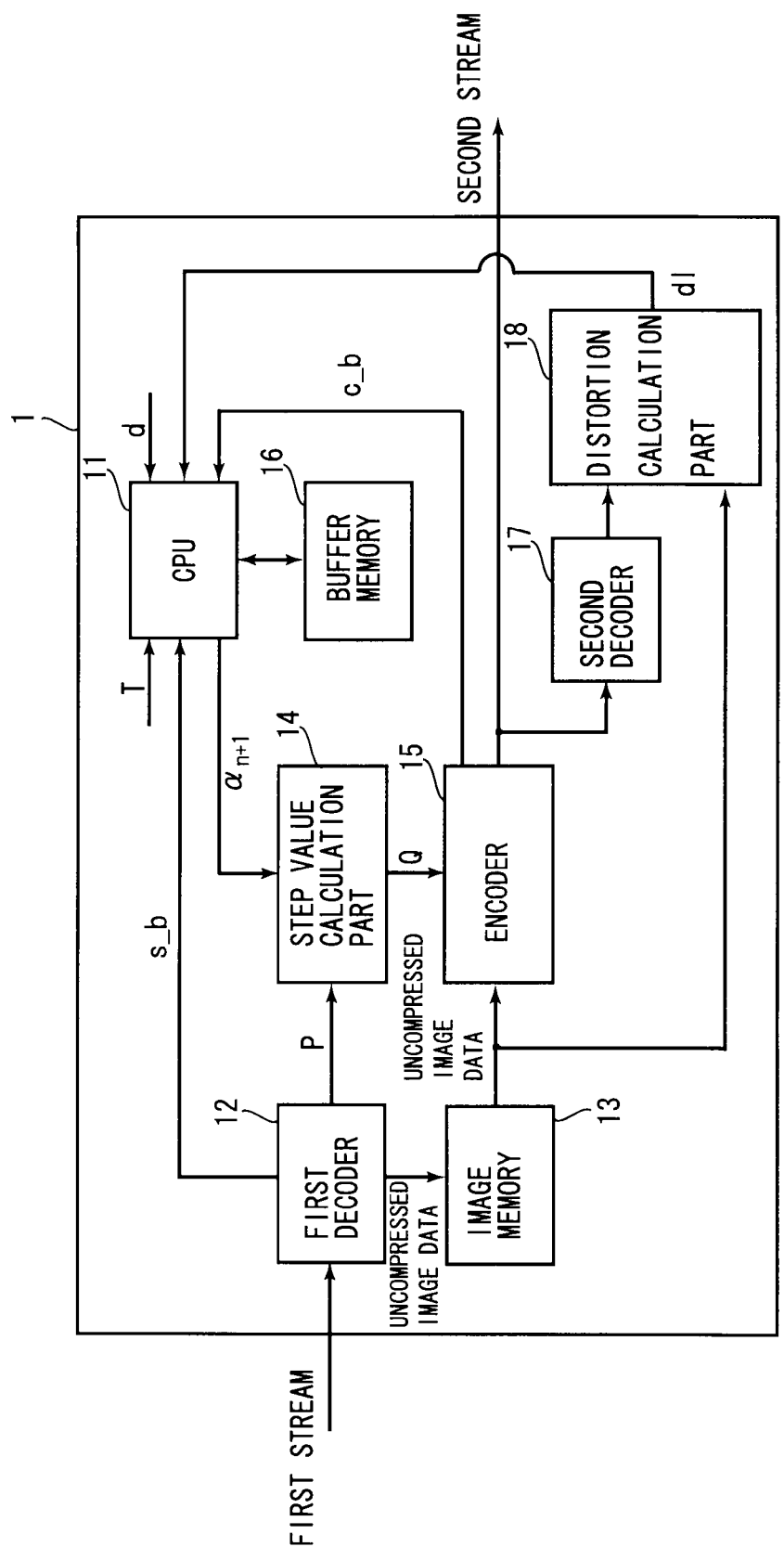
[FIG. 1] is a block diagram showing a transcoder.

Hereinafter, with reference to figures, the preferred embodiments of the present invention will be discussed. FIG. 1 is a block diagram showing a transcoder 1 in accordance with the preferred embodiments. The transcoder 1 comprises a CPU 11, a first decoder 12, an image memory 13, a step value calculation part 14, an encoder 15, a buffer memory 16, a second decoder 17, and a distortion calculation part 18.

The first decoder 12 inputs a first stream. The first stream is a stream of coded image. The first decoder 12 decodes the first stream and outputs uncompressed image data to the image memory 13. The encoder 15 again codes the uncompressed image data which is decoded and stored in the image memory 13, to thereby output a second stream.

The transcoder 1 converts a coding system of stream, and for example, inputs a first stream coded in MPEG2 and outputs a second stream coded in H.264. The present invention is devised in order to optimally control the rate of the second stream to be outputted in the conversion. Alternatively, the transcoder 1 outputs a stream of the same coding system, and for example, inputs a first stream coded in MPEG2 and outputs a second stream recoded in MPEG2. Also in this case, the present invention is devised in order to optimally control the rate of the second stream to be outputted.

Various computations performed in the first decoder 12, the step value calculation part 14, the encoder 15, the second decoder 17, and the distortion calculation part 18 may be implemented by hardware or may be implemented by software operations. In other words, these processing parts may be constructed as hardware circuits or implemented by a CPU and programs stored in memories. Alternatively, there may be a case where some of the computations are performed by hardware and the others are performed by software.

Figure 2:
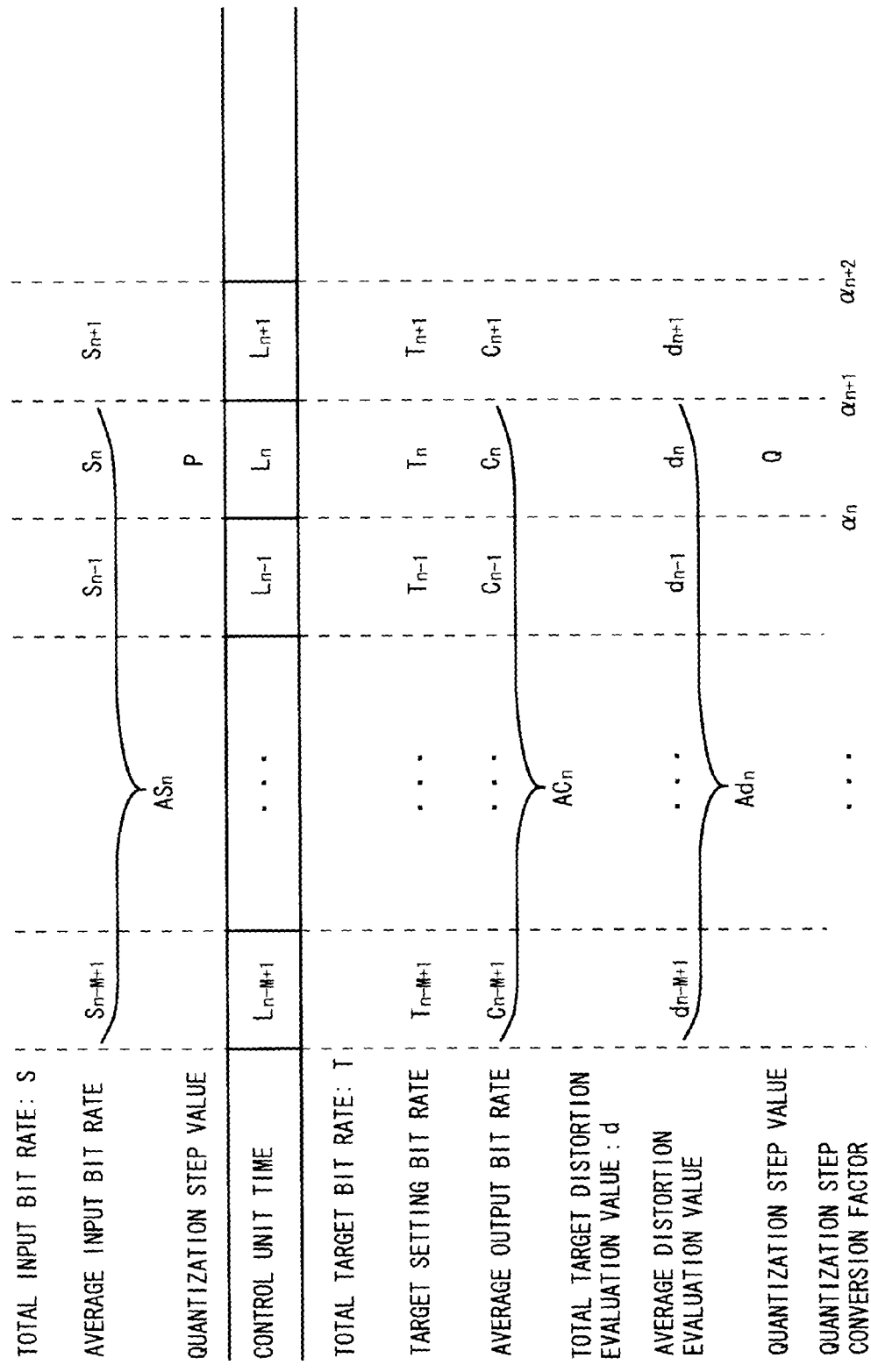
[FIG. 2] is a view showing information on an input stream (first stream) and an output stream (second stream) per control unit time.

FIG. 2 is a view showing information on streams that the transcoder 1 inputs or outputs per control unit time. The transcoder 1 divides the processing time base into control unit times $L_n$ (n=1, 2 . . . ) and performs a rate control by using this control unit time $L_n$ as a unit of processing. In the following discussion, the control unit time $L_n$ is referred to as "the n period" as appropriate. As to the control unit time $L_n$, one frame, a plurality of successive frames, one GOP, a plurality of successive GOPs, or the like may be set as one unit time.

A total input bit rate S of the first stream is acquired from a sequence header or the like. An average input bit rate $S_n$ is an average bit rate of the first stream in the n period. The transcoder 1 can store information on the average input bit rates $S_n$ for M periods in the buffer memory 16. Specifically, the buffer memory 16 can store information on the average input bit rates $S_n$ from the (n−M+1) period to the n period. An average period bit rate $AS_n$ is an average value of the average input bit rates $S_n$ from the (n−M+1) period to the n period. The average period bit rate $AS_n$ is expressed by Eq. (1).

$$AS_n = \frac{1}{M} \sum_{n-M+1}^{n} S_i \quad (1)$$

A total target bit rate T of the second stream is set by a user. For example, the user uses a not-shown operation part provided in the transcoder 1 to set the total target bit rate T.

A target setting bit rate $T_n$ is a target bit rate of the second stream in the n period. An average output bit rate $C_n$ is an average bit rate of the second stream which is already converted in the n period. The transcoder 1 can store information on the average output bit rates $C_n$ for M periods in the buffer memory 16. Specifically, the buffer memory 16 can store information on the average output bit rates $C_n$ from the (n−M+1) period to the n period. An average period bit rate $AC_n$ is an average value of the average output bit rates $C_n$ from the (n−M+1) period to the n period. The average period bit rate $AC_n$ is expressed by Eq. (2). Though the buffering period used for calculation of the average period bit rate $AS_n$ or $AC_n$ is linked to the control unit time $L_n$ in the preferred embodiments, setting of the buffering period is not limited to this case. For example, one past frame, a plurality of successive past frames, one past GOP, a plurality of successive past GOPs, or the like at the point of time when the coding is completed may be set as the buffering period.

$$AC_n = \frac{1}{M} \sum_{n-M+1}^{n} C_i \quad (2)$$

A total target distortion evaluation value d of the second stream is set by the user. For example, the user uses the not-shown operation part provided in the transcoder 1 to set the total target distortion evaluation value d.

An average distortion evaluation value $d_n$ is an evaluation value indicating the degree of image distortion of the second stream which is already converted in the n period. The transcoder 1 can store information on the average distortion evaluation values $d_n$ for M periods in the buffer memory 16. Specifically, the buffer memory 16 can store information on the average distortion evaluation values $d_n$ from the (n−M+1) period to the n period. An average period distortion evaluation value $Ad_n$ is an average value of the average distortion evaluation values $d_n$ from the (n−M+1) period to the n period. The average period distortion evaluation value $Ad_n$ is expressed by Eq. (3).

$$Ad_n = \frac{1}{M} \sum_{n-M+1}^{n} d_i \quad (3)$$

A quantization step conversion factor $\alpha_n$ is a factor calculated at the point of time when the (n−1) period is finished. A quantization step value Q of the second stream is determined by multiplying a value P, which is a quantization step value of the first stream or a value calculated from the quantization step value of the first stream, by the quantization step conversion factor $\alpha_n$. This relation is expressed by Eq. (4).

$$Q = \alpha_n P \quad (4)$$

Referring back to FIG. 1, the CPU 11 acquires a bit rate s_b for each picture of the first stream from the first decoder 12 and stores the bit rate s_b into the buffer memory 16. The CPU 11 calculates the average input bit rate $S_n$ and the average period bit rate $AS_n$ in the n period on the basis of the bit rate s_b stored in the buffer memory 16.

The first decoder 12 outputs the quantization step value P for each macroblock of the first stream to the step value calculation part 14.

The CPU 11 acquires a bit rate c_b for each picture of the converted second stream from the encoder 15 and stores the bit rate c_b into the buffer memory 16. The CPU 11 calculates the average input bit rate $C_n$ and the average period bit rate $AC_n$ in the n period on the basis of the bit rate c_b stored in the buffer memory 16.

The CPU 11 acquires the total target bit rate T and the total target distortion evaluation value d which are set by the user.

The encoder 15 encodes the uncompressed image data on the basis of the quantization step value Q inputted from the step value calculation part 14 to thereby generate the second stream. The second decoder 17 inputs the second stream encoded by the encoder 15 and decodes the second stream again to obtain the uncompressed image data. The distortion calculation part 18 inputs the uncompressed image data from each of the image memory 13 and the second decoder 17 and calculates a distortion evaluation value dI for each picture of the second stream.

For example, the distortion calculation part 18 compares the uncompressed image data acquired from the image memory 13 with the uncompressed image data acquired from the second decoder 17 and calculates a sum of squares of pixel difference values of these images, to thereby calculate the distortion evaluation value dI for each picture. Alternatively, the distortion evaluation value dI may be calculated by using a sum of absolute values of the pixel difference values of these images.

The CPU 11 inputs the distortion evaluation value dI for each picture from the distortion calculation part 18 and stores the distortion evaluation value dI into the buffer memory 16. The CPU 11 calculates the average distortion evaluation value $d_n$ and the average period distortion evaluation value $Ad_n$ from the distortion evaluation value dI stored in the buffer memory 16.

In the preferred embodiments, the smaller the distortion evaluation value dI is, the smaller the distortion of the image is. Therefore, also as to the average distortion evaluation value $d_n$ and the average period distortion evaluation value $Ad_n$, the smaller the value thereof is, the smaller the distortion of the image is. In the calculation of the distortion evaluation value dI, a weighting in accordance with a color component may be given.

The CPU 11 performs computations shown in the first to sixth preferred embodiments discussed later by using information on the total target bit rate T, the total target distortion evaluation value d, the average distortion evaluation value $d_n$, the average period distortion evaluation value $Ad_n$, the average output bit rate $C_n$, the average period bit rate $AC_n$, the average input bit rate $S_n$, the average period bit rate $AS_n$, and the like, to thereby determine the target setting bit rate $T_{n+1}$ of the second stream in the (n+1) period. Further, the CPU 11 calculates the quantization step conversion factor $\alpha_{n+1}$ from the target setting bit rate $T_{n+1}$ of the second stream in the (n+1) period and outputs the quantization step conversion factor $\alpha_{n+1}$ to the step value calculation part 14. The step value calculation part 14 performs the computation expressed by Eq. (4) to calculate the quantization step value Q of the second stream and gives the quantization step value Q to the encoder 15.

It can be seen from Eq. (4) that the quantization step conversion factor $\alpha_n$ is a ratio between the quantization step values. A relation between the ratio $R_B$ between the bit rates and the ratio $R_Q$ between the quantization step values can be expressed as Eq. (5) using a function f.

$$R_Q = f(R_B) \tag{5}$$

A specific example of the function f will be discussed. In these preferred embodiments, as shown in Eq. (6), used are functions which can control the ratio between the quantization step values with different characteristics for types I, P and B (I picture, P picture and B picture) of a picture or a macroblock. In Eq. (6), $f_I(x)$, $f_P(x)$ and $f_B(x)$ are functions adapted correspondingly to the I picture, the P picture and the B picture, respectively.

$$\begin{cases} f_I(x) = \varepsilon_I * x^{-\delta_I} = 2.1 * x^{-1.1} \\ f_P(x) = \varepsilon_P * x^{-\delta_P} = 2.1 * x^{-0.8} \\ f_B(x) = \varepsilon_B * x^{-\delta_B} = 1.3 * x^{-0.9} \end{cases} \tag{6}$$

In Eq. (6), as values of $\epsilon_I$, $\epsilon_P$, $\epsilon_B$, $\delta_I$, $\delta_P$ and $\delta_B$ in the case of stream conversion from MPEG2 into H.264, specific numerical values calculated on the basis of an experiment or the like are shown. Specifically, as the result of the experiment, when $\epsilon_I$=2.1, $\epsilon_P$=2.1, $\epsilon_B$=1.3, $\delta_I$=1.1, $\delta_P$=0.8 and $\delta_B$=0.9, an excellent feature can be obtained. Other than this, by using the feature value of the image which is acquired in decoding the input stream, the values of $\epsilon$ and $\delta$ may be determined. As expressed by Eq. (7), for example, on the basis of an activity value (act value) and a motion evaluation value (sad value) of the input stream, the values of $\epsilon$ and $\delta$ may be determined.

$$\begin{cases} f_I(x) = \varepsilon_I(a, s) * x^{-\delta_I(a,s)} \\ f_P(x) = \varepsilon_P(a, s) * x^{-\delta_P(a,s)} \\ f_B(x) = \varepsilon_B(a, s) * x^{-\delta_B(a,s)} \end{cases} \tag{7}$$

In Eq. (7), "a" represents the act value and "s" represents the sad value, and $\epsilon_I(a, s)$, $\epsilon_P(a, s)$, $\epsilon_B(a, s)$, $-\delta_I(a, s)$, $-\delta_P(a, s)$, $-\delta_B(a, s)$ represent the values of $\epsilon$ and $\delta$ which are calculated by using the act value and the sad value as parameters.

The activity value is obtained by calculating a sum of absolute differences (SAD) of an average pixel value in a macroblock and a pixel value of each pixel in the macroblock by the macroblock. In other words, the activity value is an evaluation value indicating the degree of dispersion of pixels in the macroblock. This is the same as an activity value used in the code amount control model TM5 of MPEG2 or the like. The motion evaluation value (sad value) is obtained by calculating an interframe sum of absolute differences of a pixel value of each pixel in a reference image macroblock and a pixel value of the corresponding pixel in a macroblock, by the macroblock. In other words, the motion evaluation value is obtained by comparing each pixel in a macroblock with the corresponding pixel in the reference image macroblock and calculating a sum of absolute values of differences of pixel values of corresponding pixels in the same coordinate positions.

More generally, assuming that an feature value of an image in the n period is determined as $I_{Ln}$, $f_I(x)$, $f_P(x)$ and $f_B(x)$ are expressed by Eq. (8).

$$\begin{cases} f_I(x) = \varepsilon_I(I_{L_n}) * x^{-\delta_I(I_{L_n})} \\ f_P(x) = \varepsilon_P(I_{L_n}) * x^{-\delta_P(I_{L_n})} \\ f_B(x) = \varepsilon_B(I_{L_n}) * x^{-\delta_B(I_{L_n})} \end{cases} \tag{8}$$

In Eq. (8), $\epsilon_I(I_{Ln})$, $\epsilon_P(I_{Ln})$, $\epsilon_B(I_{Ln})$, $-\delta_I(I_{Ln})$, $-\delta_P(I_{Ln})$ and $-\delta_B(I_{Ln})$ represent the factors $\epsilon$ and $\delta$ which are determined by using the feature value $I_{Ln}$ of the image as a parameter.

The First Preferred Embodiment

Next, the first preferred embodiment of the present invention will be discussed. The transcoder 1 of the first preferred embodiment determines the target setting bit rate $T_{n+1}$ of the second stream in the (n+1) period at the point of time when the n period is finished. After the target setting bit rate $T_{n+1}$ in the (n+1) period is determined, the quantization step conversion factor $\alpha_{n+1}$ is calculated in the same manner as discussed with reference to Eq. (5). In other words, the quantization step conversion factor $\alpha_{n+1}$ is calculated by using the function f shown in Eqs. (6) to (8).

Specifically, as expressed by Eq. (9), the quantization step conversion factor $\alpha_{n+1}$ is calculated by substituting the ratio between the target setting bit rate $T_{n+1}$ in the (n+1) period and the average input bit rate $S_n$ in the n period into the function f. Then, the computation expressed by Eq. (4) is performed by using the calculated quantization step conversion factor $\alpha_{n+1}$, to thereby calculate the quantization step value Q of the second stream.

$$\alpha_{n+1} = f(T_{n+1}/S_n) \quad (9)$$

Alternatively, as expressed by Eq. (10), the quantization step conversion factor $\alpha_{n+1}$ may be calculated by using the average period bit rate $AS_n$ from the (n−M+1) period to the n period, instead of the average input bit rate $S_n$ in the n period.

$$\alpha_{n+1} = f(T_{n+1}/AS_n) \quad (10)$$

Eq. (11) is an equation for calculation of the target setting bit rate $T_{n+1}$ in the (n+1) period. In other words, Eq. (11) represents the target setting bit rate in the (n+1) period calculated by the transcoder 1 after the n period is finished. Specifically, assuming that a value obtained by dividing the average distortion evaluation value $d_n$ of the second stream which is already converted in the n period by the total target distortion evaluation value d is determined as a target distortion ratio, the target setting bit rate $T_{n+1}$ in the (n+1) period can be calculated by multiplying the total target bit rate T of the second stream by the target distortion ratio.

$$T_{n+1} = T * k * \frac{d_n}{d} \quad (11)$$

In Eq. (11), "k" is a positive factor and a factor for adjusting the target distortion ratio. When the average distortion evaluation value $d_n$ in the n period exceeds the total target distortion evaluation value d, the image quality is lower than the target quality. In this case, adjustment is made toward the direction in which $d_n/d$ will become larger than 1 and the target setting bit rate $T_{n+1}$ will become larger. In the reverse case where the $d_n/d$ is smaller than 1, since the image quality is higher than the target quality, the target setting bit rate $T_{n+1}$ is suppressed. The bit rate by which the target setting bit rate $T_{n+1}$ is suppressed may be allocated to another control unit time where the image quality is degraded. When the image quality is higher than the target quality, it is not always necessary to suppress the target setting bit rate $T_{n+1}$. Thus, the ratio of the image distortion to the target distortion is calculated by the $d_n/d$ and the target setting bit rate $T_{n+1}$ in the (n+1) period is adjusted by multiplying the total target bit rate T by the target distortion ratio so that the distortion of the image may not become larger.

Though the total target bit rate T of the second stream is multiplied by the $d_n/d$ as the target distortion ratio (while the factor k is also used as a multiplier) in Eq. (11), the target distortion ratio may be obtained by substituting the $d_n/d$ into a function $\theta_n$ as expressed by Eq. (12). In this case, the target setting bit rate $T_{n+1}$ can be adjusted by adding the target distortion ratio to the total target bit rate T.

$$T_{n+1} = T + \theta_1\left(\frac{d_n}{d}\right) \quad (12)$$

Eq. (13) is an equation representing the specific example of the function $\theta_1$.

$$\theta_1(x) = \begin{cases} x - 1 - b_0 & (x \geq 1 + c_0) \\ a_0 * (x-1)^3 & (1 + c_0 > x \geq 1) \\ a_1 * (x-1)^3 & (1 > x \geq 1 - c_1) \\ x - 1 + b_1 & (1 - c_1 > x) \end{cases} \quad (13)$$

Figure 3:
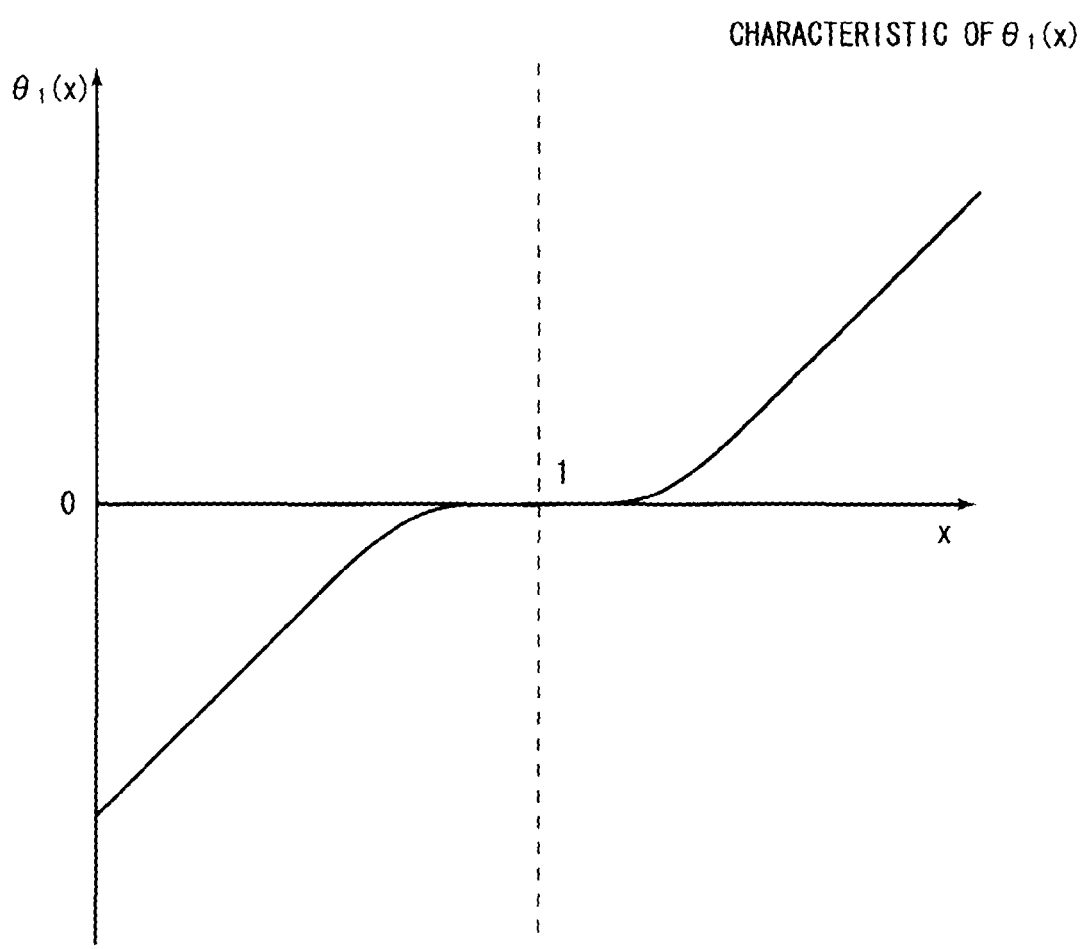
[FIG. 3] is a view showing a characteristic of a function $\theta_1$.

A relation of $a_0$, $a_1$, $b_0$, $b_1$, $c_0$, and $c_1$ in Eq. (13) is expressed by Eq. (14). A characteristic of the function $\theta_1$ represented by such a condition is shown in FIG. 3.

$$a_0 > 0, \quad a_1 > 0 \quad (14)$$
$$c_0 = \frac{1}{\sqrt{3 * a_0}}, \quad c_1 = \frac{1}{\sqrt{3 * a_1}}$$
$$b_0 = \frac{2}{3} * c_0, \quad b_1 = \frac{2}{3} * c_1$$

Thus, the function $\theta_1$ has the characteristic that when an input value is close to "1", an output does not vary significantly from "0". From the time when the input value becomes larger than a threshold value (or when the input value becomes smaller than a threshold value), the output value also varies linearly. In the specific examples expressed by Eqs. (13) and (14), the variation of the output value also becomes larger from the time when the input value becomes larger than $(1+c_0)$ or becomes smaller than $(1-c_1)$.

By using the function $\theta_1$, it is possible to avoid significant variation of the target setting bit rate $T_{n+1}$ from the total target bit rate T even when the $d_n/d$ deviates a little from "1". In a case where the target distortion ratio relatively largely deviates, by varying the target setting bit rate it is possible to ensure improvement of the image quality.

In the exemplary case shown in FIG. 3, the function $\theta_1$ has the characteristic of bilateral symmetry (point symmetry with respect to the point (1, 0)). In other words, the rate of change is symmetric with respect to a boundary where the value of the $d_n/d$ is 1. The rate of increase in the target distortion ratio in the case where the value of the $d_n/d$ is larger than 1 is equal to the rate of decrease in the target distortion ratio in the case where the value of the $d_n/d$ is smaller than 1. The rate of change may be asymmetric with respect to a boundary where the value of the $d_n/d$ is 1. In this case, the rate of increase in the target distortion ratio in the case where the value of the $d_n/d$ is larger than 1 is different from the rate of decrease in the target distortion ratio in the case where the value of the $d_n/d$ is smaller than 1. By controlling the values of $a_0$ and $a_1$, it is possible to provide a characteristic of bilateral asymmetry. By increasing $a_n$ and decreasing $a_1$, for example, when the distortion evaluation value of the image is larger than a target distortion value, quick improvement of the image quality is performed and when the distortion evaluation value of the image is smaller than the target distortion value, the bit rate is gently suppressed.

The Second Preferred Embodiment

Next, the second preferred embodiment of the present invention will be discussed. Also in the second preferred embodiment, like in the first preferred embodiment, the transcoder 1 determines the target setting bit rate $T_{n+1}$ of the second stream in the (n+1) period at the point of time when the n period is finished.

After the target setting bit rate $T_{n+1}$ in the (n+1) period is determined, the quantization step conversion factor $\alpha_{n+1}$ is calculated in the same manner as discussed with reference to Eq. (5). In other words, the quantization step conversion factor $\alpha_{n+1}$ is calculated by performing the computation expressed by Eq. (9) or Eq. (10) using the function f shown in Eqs. (6) to (8). After the quantization step conversion factor $\alpha_{n+1}$ is calculated, the quantization step value Q of the second stream is calculated by using Eq. (4).

Eq. (15) is an equation for calculation of the target setting bit rate $T_{n+1}$ in the (n+1) period. In this case, a value obtained by dividing the average output bit rate $C_n$ of the second stream which is already converted in the n period by the target setting bit rate $T_n$ in the n period is determined as a target rate ratio. The target setting bit rate $T_{n+1}$ in the (n+1) period can be calculated by multiplying a quotient of the total target bit rate T of the second stream divided by the target rate ratio by the target distortion ratio. The target distortion ratio is a value obtained by dividing the average distortion evaluation value $d_n$ by the total target distortion evaluation value d like in the first preferred embodiment.

$$T_{n+1} = k * \frac{T}{\frac{C_n}{T_n}} * \frac{d_n}{d} \quad (15)$$

In Eq. (15), "k" is a positive factor and a factor for adjusting the target rate ratio and the target distortion ratio. A ratio of the bit rate to the target bit rate in the n period is calculated by $C_n/T_n$ and the target setting bit rate $T_{n+1}$ in the (n+1) period is adjusted by dividing the total target bit rate T by the target rate ratio. When the average output bit rate $C_n$ exceeds the target setting bit rate T, the $C_n/T_n$ becomes larger than 1 and then the target setting bit rate $T_{n+1}$ is suppressed and controlled so that the bit rate should be close to the target bit rate on the whole.

Further, the total target bit rate T is multiplied by the target distortion ratio ($d_n/d$) and when the image quality is degraded ($d_n/d$ is larger than 1), adjustment is made toward the direction to increase the target setting bit rate $T_{n+1}$. It is thereby possible to improve the image quality while maintaining the target bit rate. In the reverse case where the $d_n/d$ is smaller than 1, since the image quality is higher than the target quality, the target setting bit rate $T_{n+1}$ is suppressed. The bit rate by which the target setting bit rate $T_{n+1}$ is suppressed may be allocated to another control unit time where the image quality is degraded. When the image quality is higher than the target quality, it is not always necessary to suppress the target setting bit rate $T_{n+1}$.

Though the $C_n/T_n$ is used as the target rate ratio (while the factor k is also used as a multiplier) in Eq. (15), the target rate ratio may be obtained by substituting the $C_n/T_n$ into a function $\theta_2$ as expressed by Eq. (16).

$$T_{n+1} = k * \frac{T}{\theta_2\left(\frac{C_n}{T_n}\right)} * \frac{d_n}{d} \quad (16)$$

Eq. (17) is an equation representing the specific example of the function $\theta_2$.

$$\theta_2(x) = \begin{cases} x - b_0 & (x \geq 1 + c_0) \\ a_0 * (x-1)^3 + 1 & (1 + c_0 > x \geq 1) \\ a_1 * (x-1)^3 + 1 & (1 > x \geq 1 - c_1) \\ x + b_1 & (1 - c_1 > x) \end{cases} \quad (17)$$

Figure 4:
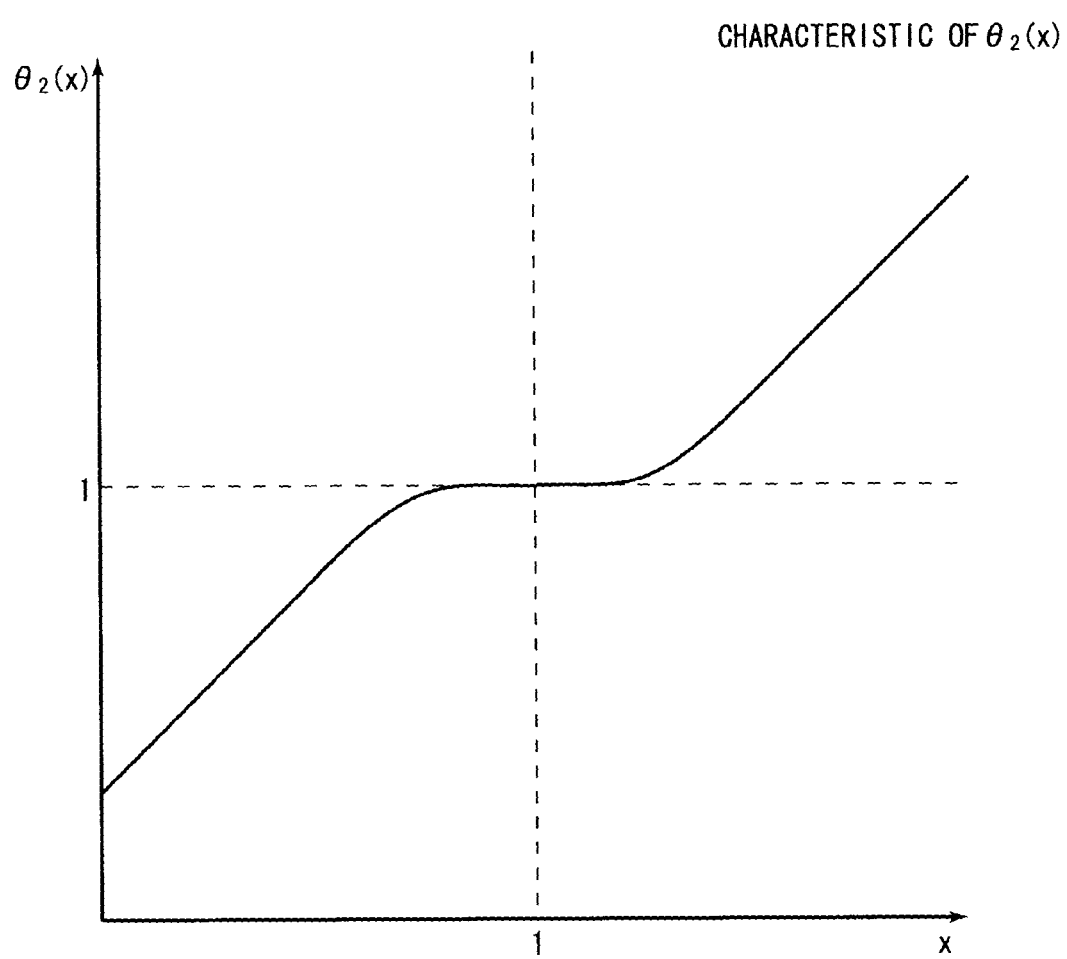
[FIG. 4] is a view showing a characteristic of a function $\theta_2$.

A relation of $a_0$, $a_1$, $b_0$, $b_1$, $c_0$, and $c_1$ in Eq. (17) is expressed by Eq. (18). A characteristic of the function $\theta_2$ represented by such a condition is shown in FIG. 4.

$$a_0 > 0, \quad a_1 > 0 \quad (18)$$
$$c_0 = \frac{1}{\sqrt{3 * a_0}}, \quad c_1 = \frac{1}{\sqrt{3 * a_1}}$$
$$b_0 = \frac{2}{3} * c_0, \quad b_1 = \frac{2}{3} * c_1$$

Thus, the function $\theta_2$ has the characteristic that when the input value is close to "1", an output does not vary significantly from "1". From the time when the input value becomes larger than a threshold value (or when the input value becomes smaller than a threshold value), the output value also varies linearly. In the specific examples expressed by Eqs. (17) and (18), the variation of the output value also becomes larger from the time when the input value becomes larger than $(1+c_0)$ or becomes smaller than $(1-c_1)$.

By using the function $\theta_2$, it is possible to avoid significant variation of the target setting bit rate $T_{n+1}$ from the total target bit rate T even when the $C_n/T_n$ deviates a little from "1". In a case where the target rate ratio relatively largely deviates, by varying the target setting bit rate $T_{n+1}$, it is possible to optimally follow the target.

In the exemplary case shown in FIG. 4, the function $\theta_2$ has the characteristic of bilateral symmetry (point symmetry with respect to the point (1, 1)). In other words, the rate of change is symmetric with respect to a boundary where the value of the $C_n/T_n$ is 1. The rate of increase in the target rate ratio in the case where the value of the $C_n/T_n$ is larger than 1 is equal to the rate of decrease in the target rate ratio in the case where the value of the $C_n/T_n$ is smaller than 1. The rate of change may be asymmetric with respect to a boundary where the value of the $C_n/T_n$ is 1. In this case, the rate of increase in the target rate ratio in the case where the value of the $C_n/T_n$ is larger than 1 is different from the rate of decrease in the target rate ratio in the case where the value of the $C_n/T_n$ is smaller than 1. By controlling the values of $a_0$ and $a_1$, it is possible to provide a characteristic of bilateral asymmetry. By increasing $a_0$ and decreasing $a_1$, for example, when the bit rate becomes larger than the target value, the bit rate can be controlled to quickly decrease to the target value and when the bit rate becomes smaller than the target value, the bit rate can be controlled to gently increase to the target value.

Though the value obtained by dividing the average output bit rate $C_n$ of the second stream in the n period by the target setting bit rate $T_n$ is used as the target rate ratio in Eq. (15), the target rate ratio is further adjusted in Eq. (19).

$$T_{n+1} = k * \frac{T}{\frac{S_{n-1}}{S_n} * \frac{C_n}{T_n}} * \frac{d_n}{d} \quad (19)$$

In Eq. (19), the target rate ratio is multiplied by $S_{n-1}/S_n$. The $S_{n-1}/S_n$ is a value obtained by dividing the average input bit rate $S_{n-1}$ of the first stream in the (n−1) period by the average input bit rate $S_n$ of the first stream in the n period and may be referred to as a period ratio of the average input bit rates. In other words, the target ratio is adjusted by multiplying the target rate ratio by the period ratio.

By multiplying the target ratio by the period ratio, it is possible to correct local variation of the target ratio. When the average input bit rate $S_n$ locally decrease, for example, the target ratio $C_n/T_n$ also accordingly decrease in some cases. Also in such a case, the target ratio is adjusted by multiplying the target ratio by the period ratio $S_{n-1}/S_n$ (the period ratio takes a value larger than 1 in this case) and it is possible to avoid significant variation of the target setting bit rate $T_{n+1}$. In the reverse case where the average input bit rate $S_n$ locally increase, the period ratio $S_{n+1}/S_n$ takes a value smaller than 1 and it is possible to suppress a quick increase of the target ratio.

Also in the method of calculating the target setting bit rate $T_{n+1}$ by using the function $\theta_2$ expressed by Eq. (16), similarly, the target rate ratio may be set by multiplying the target rate ratio by the period ratio. The target setting bit rate $T_{n+1}$ calculated by this method is shown in Eq. (20). Also in this case, the target rate ratio is adjusted with the variation of the average input bit rate and it is possible to avoid significant variation of the target setting bit rate $T_{n+1}$.

$$T_{n+1} = k * \frac{T}{\frac{S_{n-1}}{S_n} * \theta_2\left(\frac{C_n}{T_n}\right)} * \frac{d_n}{d} \quad (20)$$

In Eq. (19), the value obtained by dividing the average input bit rate $S_{n-1}$ of the first stream in the (n−1) period by the average input bit rate $S_n$ of the first stream in the n period is used as the period ratio. On the other hand, in a case where the average input bit rate $S_{n+1}$ of the first stream in the (n+1) period can be obtained in advance, the average input bit rate $S_{n+1}$ may be used. The case where the average input bit rate $S_{n+1}$ can be obtained in advance refers to a case where there is spare time to perform buffering of information on the average input bit rate $S_{n+1}$ and then calculate the target setting bit rate $T_{n+1}$ in the (n+1) period. In other words, it refers to a case where a processing delay to some degree is allowed.

In the case where the average input bit rate $S_{n+1}$ can be obtained in advance, in Eq. (19), the target rate ratio may be multiplied by the period ratio $S_n/S_{n+1}$, instead of the period ratio $S_{n-1}/S_n$. By using the latest input information, it is possible to ensure optimal control of the target bit rate.

In Eq. (20), the target rate ratio obtained by using the function $\theta_2$ is multiplied by the period ratio. Also in this case, similarly, the target rate ratio may be multiplied by the period ratio $S_n/S_{n+1}$, instead of the period ratio $S_{n-1}/S_n$. It is thereby possible to control the target setting bit rate $T_{n+1}$ with higher accuracy.

In the case where the average input bit rate $S_{n+1}$ of the first stream in the (n+1) period is used as the period ratio, instead of Eq. (9), as expressed by Eq. (21), by substituting a ratio between the target setting bit rate $T_{n+1}$ in the (n+1) period and the average input bit rate $S_{n+1}$ in the (n+1) period into the function f, the quantization step conversion factor $\alpha_{n+1}$ in the (n+1) period can be calculated.

$$\alpha_{n+1} = f(T_{n+1}/S_{n+1}) \quad (21)$$

In Eq. (19) and Eq. (20), the $S_{n-1}/S_n$ is used as the period ratio. Instead, a ratio between the average period bit rate $AS_{n-1}$ for past M periods including the (n−1) period and the average period bit rate $AS_n$ for past M periods including the n period may be used as the period ratio. In other words, in Eqs. (19) and (20), $AS_{n-1}/AS_n$ may be used as the period ratio, instead of the $S_{n-1}/S_n$. It is thereby possible to ensure optimal control of the target setting bit rate $T_{n+1}$ by reducing the effect of the local variation.

Alternatively, in the case where the average input bit rate $S_{n+1}$ of the first stream in the (n+1) period can be obtained in advance, a ratio between the average period bit rate $AS_n$ for the past M periods including the n period and the average period bit rate $AS_{n+1}$ for past M periods including the (n+1) period may be used as the period ratio. In other words, in Eqs. (19) and (20), $AS_n/AS_{n+1}$ may be used as the period ratio, instead of the $S_{n-1}/S_n$. It is thereby possible to control the target setting bit rate $T_{n+1}$ with higher accuracy by reducing the effect of the local variation and using the latest input bit rate.

In the case where the average period bit rate $AS_{n+1}$ for the past M periods including the (n+1) period is used as the period ratio, instead of Eq. (10), as expressed by Eq. (22), by substituting a ratio between the target setting bit rate $T_{n+1}$ in the (n+1) period and the average period bit rate $AS_{n+1}$ for the past M periods including the (n+1) period into the function f, the quantization step conversion factor $\alpha_{+1}$ in the (n+1) period can be calculated.

$$\alpha_{n+1} = f(T_{n+1}/AS_{n+1}) \quad (22)$$

Though the method of calculating the target setting bit rate $T_{n+1}$ in the second preferred embodiment has been discussed with reference to Eqs. (15), (16), (19), (20), and the like, in all the cases of the second preferred embodiment including the cases discussed with reference to these equations, the average period bit rate $AC_n$ from the (n−M+1) period to the n period may be used, instead of the average output bit rate $C_n$ in the n period. In Eqs. (15), (16), (19), (20), and the like, for example, $AC_n$ is used instead of $C_n$. It is thereby possible to ensure optimal control of the target setting bit rate $T_{n+1}$ by gently evaluating the variation of $C_n$.

The Third Preferred Embodiment

Next, the third preferred embodiment of the present invention will be discussed. Also in the third preferred embodiment, like in the first and second preferred embodiments, the transcoder 1 determines the target setting bit rate $T_{n+1}$ of the second stream in the (n+1) period at the point of time when the n period is finished.

After the target setting bit rate $T_{n+1}$ in the (n+1) period is determined, the quantization step conversion factor $\alpha_{n+1}$ is calculated in the same manner as discussed with reference to Eq. (5). In other words, the quantization step conversion factor $\alpha_{n+1}$ is calculated by performing the computation expressed by Eq. (9) or Eq. (10) using the function f shown in Eqs. (6) to (8). After the quantization step conversion factor $\alpha_{n+1}$ is calculated, the quantization step value Q of the second stream is calculated by using Eq. (4).

Eq. (23) is an equation for calculation of the target setting bit rate $T_{n+1}$ in the (n+1) period. In this case, a value obtained by subtracting the average output bit rate $C_n$ of the second stream which is already converted in the n period from the target setting bit rate $T_n$ in the n period is determined as a target rate difference. The target rate difference is adjusted by multiplying the target rate difference by the target distortion ratio $(d_n/d)$. The target setting bit rate $T_{n+1}$ in the (n+1) period can be calculated by adding the target rate difference adjusted by the target distortion ratio to the total target bit rate T of the second stream.

$$T_{n+1} = T + k * (T_n - C_n) * \frac{d_n}{d} \qquad (23)$$

In Eq. (23), "k" is a positive factor and a factor for adjusting the target rate difference and the target distortion ratio. A difference between the bit rate and the target bit rate in the n period is calculated by $(T_n-C_n)$ and the target setting bit rate $T_{n+1}$ in the (n+1) period is adjusted by adding the target rate difference to the total target bit rate T. When the average output bit rate $C_n$ exceeds the target setting bit rate $T_n$, the $(T_n-C_n)$ becomes a negative value and the target setting bit rate $T_{n+1}$ is suppressed and controlled so that the bit rate should be close to the target bit rate on the whole. In the reverse case where the average output bit rate $C_n$ is smaller than the target setting bit rate $T_n$, the $(T_n-C_n)$ becomes a positive value and the target setting bit rate $T_{n+1}$ is increased and controlled so that the bit rate should be close to the target bit rate on the whole.

Further, the target rate difference is multiplied by the target distortion ratio $(d_n/d)$. When the average output bit rate $C_n$ is smaller than the target setting bit rate $T_n$ and the image quality is lower than the target quality, the $d_n/d$ becomes larger than 1 and adjustment is made toward the direction to increase an increase range of the target setting bit rate $T_{n+1}$. It is thereby possible to quickly improve the image quality. When the average output bit rate $C_n$ is larger than the target setting bit rate $T_n$ and the image quality is higher than the target quality, the $d_n/d$ becomes smaller than 1 and this decreases a suppression range of the target setting bit rate $T_{n+1}$ and gently suppresses the bit rate.

Though the $(T_n-C_n)$ is used as the target rate difference (while the factor k is also used as a multiplier) in Eq. (23), the target rate difference may be obtained by substituting the $(T_n-C_n)$ into a function $\theta_3$ as expressed by Eq. (24).

$$T_{n+1} = T + \theta_3(T_n - C_n) * \frac{d_n}{d} \qquad (24)$$

Eq. (25) is an equation representing the specific example of the function $\theta_3$.

$$\theta_3(x) = \begin{cases} x - b_0 & (x \geq c_0) \\ a_0 * x^3 & (c_0 > x \geq 0) \\ a_1 * x^3 & (0 > x \geq c_1) \\ x + b_1 & (-c_1 > x) \end{cases} \qquad (25)$$

Figure 5:
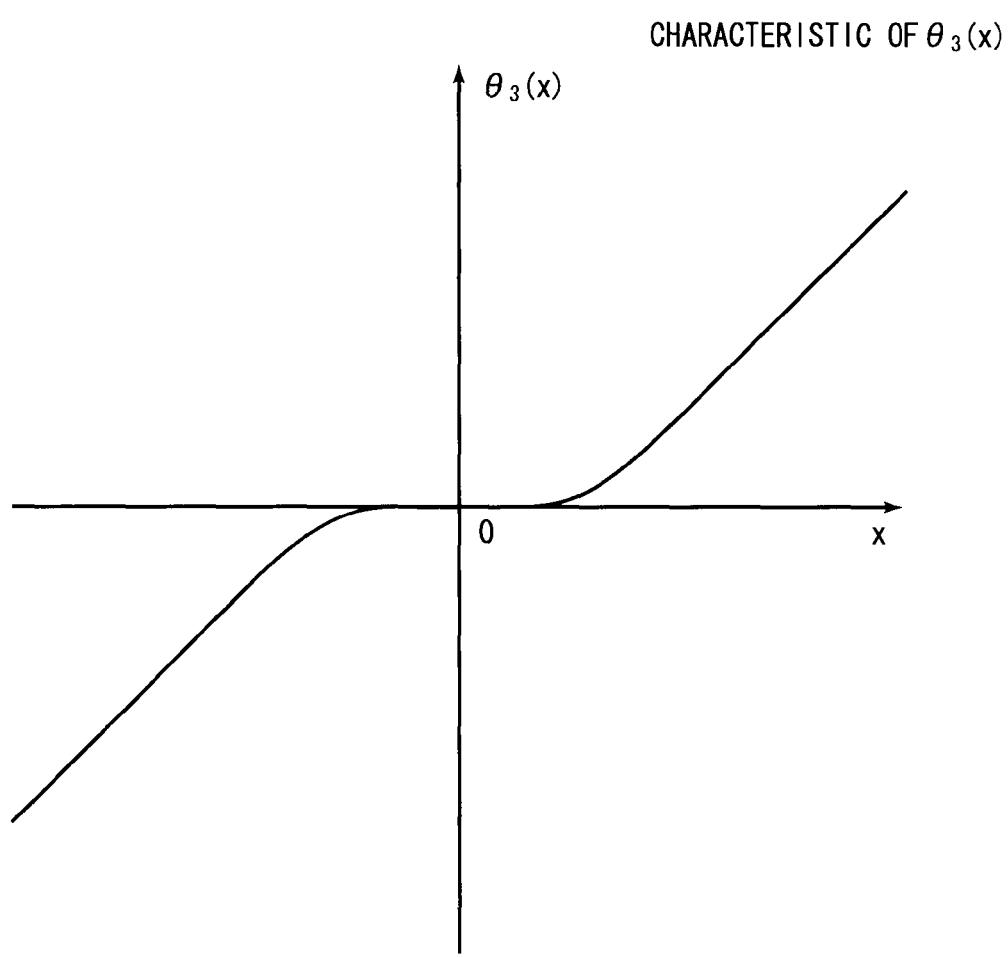
[FIG. 5] is a view showing a characteristic of a function $\theta_3$.

A relation of $a_0$, $a_1$, $b_0$, $b_1$, $c_0$, and $c_1$ in Eq. (25) is expressed by Eq. (26). A characteristic of the function $\theta_3$ represented by such a condition is shown in FIG. 5.

$$a_0 > 0, a_1 > 0 \qquad (26)$$
$$c_0 = \frac{1}{\sqrt{3 * a_0}}, c_1 = \frac{1}{\sqrt{3 * a_1}}$$
$$b_0 = \frac{2}{3} * c_0, b_1 = \frac{2}{3} * c_1$$

Thus, the function $\theta_3$ has the characteristic that when the input value is close to "0", an output does not vary significantly from "0". In the specific examples expressed by Eqs. (25) and (26), the output value also significantly varies from the time when the input value becomes larger than $c_0$ or becomes smaller than $-c_1$.

By using the function $\theta_3$, it is possible to avoid significant variation of the target setting bit rate $T_{n+1}$ from the total target bit rate T even when the $(T_n-C_n)$ deviates a little from "0". In a case where the target difference relatively largely deviates, by varying the target setting bit rate $T_{n+1}$, it is possible to optimally follow the target.

In the exemplary case shown in FIG. 5, the function $\theta_3$ has the characteristic of bilateral symmetry (point symmetry with respect to the point (0, 0)). In other words, the rate of change is symmetric with respect to a boundary where the value of the $(T_n-C_n)$ is 0. By increasing $a_1$ and decreasing $a_0$, for example, when the bit rate becomes larger than the target value, the bit rate can be controlled to quickly decrease to the target value and when the bit rate becomes smaller than the target value, the bit rate can be controlled to gently increase to the target value.

Though the target rate difference obtained by subtracting the average output bit rate $C_n$ of the second stream in the n period from the target setting bit rate $T_n$ in the n period is used in Eq. (23), the target rate difference is further adjusted in Eq. (27).

$$T_{n+1} = T + k * \frac{S_n}{S_{n-1}} * (T_n - C_n) * \frac{d_n}{d} \qquad (27)$$

In Eq. (27), the target rate difference is multiplied by $S_n/S_{n-1}$. The $S_n/S_{n-1}$ is a period ratio obtained by dividing the average input bit rate $S_n$ of the first stream in the n period by the average input bit rate $S_{n-1}$ of the first stream in the (n-1) period. In other words, the target difference is adjusted by multiplying the target rate difference by the period ratio.

By multiplying the target rate difference by the period ratio, it is possible to correct local variation of the target difference. When the average input bit rate $S_n$ in the n period varies locally less than that in the (n-1) period, for example, the target rate difference $(T_n-C_n)$ accordingly increases quickly in some cases. Also in such a case, the target rate difference is adjusted by multiplying the target rate difference by the period ratio $S_n/S_{n-1}$ (the period ratio takes a value smaller than 1 in this case) and it is possible to avoid a quick increase of the target setting bit rate $T_{n+1}$.

Further, the target rate difference is multiplied by the target distortion ratio $(d_n/d)$. When the average output bit rate $C_n$ is smaller than the target setting bit rate $T_n$ and the image quality is lower than the target quality, the $d_n/d$ becomes larger than 1 and adjustment is made toward the direction to increase the increase range of the target setting bit rate $T_{n+1}$. It is thereby possible to quickly improve the image quality. When the average output bit rate $C_n$ is larger than the target setting bit rate $T_n$ and the image quality is higher than the target quality, the $d_n/d$ becomes smaller than 1 and this decreases the suppression range of the target setting bit rate $T_{n+1}$ and gently suppresses the bit rate.

Also in the method of calculating the target setting bit rate $T_{n+1}$ by using the function $\theta_3$ expressed by Eq. (24), similarly, the target rate difference may be set by multiplying the target rate difference by the period ratio. The target setting bit rate $T_{n+1}$ calculated by this method is shown in Eq. (28). Also in this case, the target rate difference is adjusted with the variation of the average input bit rate and it is possible to avoid significant variation of the target setting bit rate $T_{n+1}$. Further, the target rate difference is multiplied by the target distortion ratio ($d_n/d$) and it is thereby possible to improve the image quality while maintaining the target bit rate.

$$T_{n+1} = T + \frac{S_n}{S_{n-1}} * \theta_3(T_n - C_n) * \frac{d_n}{d} \quad (28)$$

In Eq. (27), the value obtained by dividing the average input bit rate $S_n$ of the first stream in the n period by the average input bit rate $S_{n-1}$ of the first stream in the (n−1) period is used as the period ratio. On the other hand, in the case where the average input bit rate $S_{n+1}$ of the first stream in the (n+1) period can be obtained in advance, the average input bit rate $S_{n+1}$ may be used. As discussed above, the case where the average input bit rate $S_{n+1}$ can be obtained in advance refers to a case where there is spare time to perform buffering of information on the average input bit rate $S_{n+1}$ and then calculate the target setting bit rate $T_{n+1}$ in the (n+1) period. In this case, in Eq. (27), $S_{n+1}/S_n$ is used, instead of the $S_n/S_{n-1}$. Thus, by using the average input bit rate $S_{n+1}$ of the first stream in the (n+1) period, it is possible to control the target setting bit rate $T_{n+1}$ with higher accuracy.

In Eq. (28), the target rate difference obtained by using the function $\theta_3$ is multiplied by the period ratio. Also in this case, similarly, the period ratio $S_{n+1}/S_n$ may be used, instead of the period ratio $S_n/S_{n-1}$. Also in this case, it is thereby possible to control the target setting bit rate $T_{n+1}$ with higher accuracy.

In the case where the average input bit rate $S_{n+1}$ of the first stream in the (n+1) period is used as the period ratio, instead of Eq. (9), as expressed by Eq. (21), by substituting the ratio between the target setting bit rate $T_{n+1}$ in the (n+1) period and the average input bit rate $S_{n+1}$ in the (n+1) period into the function f, the quantization step conversion factor $\alpha_{n+1}$ in the (n+1) period can be calculated.

In Eq. (27) and Eq. (28), the $S_n/S_n$, is used as the period ratio. Instead, a ratio between the average period bit rate $AS_n$ for the past M periods including the n period and the average period bit rate $AS_{n-1}$ for the past M periods including the (n−1) period may be used as the period ratio. In other words, in Eqs. (27) and (28), $AS_n/AS_{n-1}$ may be used as the period ratio, instead of the $S_n/S_{n-1}$. It is thereby possible to ensure optimal control of the target setting bit rate $T_{n+1}$ by reducing the effect of the local variation.

Alternatively, in the case where the average input bit rate $S_{n+1}$ of the first stream in the (n+1) period can be obtained in advance, the ratio between the average period bit rate $AS_{n+1}$ for the past M periods including the (n+1) period and the average period bit rate $AS_n$ for the past M periods including the n period may be used as the period ratio. In other words, in Eqs. (27) and (28), $AS_{n+1}/AS_n$ may be used as the period ratio, instead of the $S_n/S_{n-1}$. It is thereby possible to control the target setting bit rate $T_{n+1}$ with higher accuracy by reducing the effect of the local variation and using the latest input bit rate.

In the case where the average period bit rate $AS_{n+1}$ for the past M periods including the (n+1) period is used as the period ratio, instead of Eq. (10), as expressed by Eq. (22), by substituting the ratio between the target setting bit rate $T_{n+1}$ in the (n+1) period and the average period bit rate $AS_{n+1}$ for the past M periods including the (n+1) period into the function f, the quantization step conversion factor $\alpha_{n+1}$ in the (n+1) period can be calculated.

Though the method of calculating the target setting bit rate $T_{n+1}$ in the third preferred embodiment has been discussed with reference to Eqs. (23), (24), (27), (28), and the like, in all the cases of the third preferred embodiment including the cases discussed with reference to these equations, the average period bit rate $AC_n$ from the (n−M+1) period to the n period may be used, instead of the average output bit rate $C_n$ in the n period. In Eqs. (23), (24), (27), (28), and the like, for example, $AC_n$ may be used instead of $C_n$. It is thereby possible to ensure optimal control of the target setting bit rate $T_{n+1}$ by gently evaluating the variation of $C_n$.

The Fourth Preferred Embodiment

Next, the fourth preferred embodiment of the present invention will be discussed. Also in the fourth preferred embodiment, like in the first to third preferred embodiments, the transcoder 1 determines the target setting bit rate $T_{n+1}$ of the second stream in the (n+1) period at the point of time when the n period is finished. The fourth preferred embodiment is an application example of the first to third preferred embodiments.

Though the value obtained by dividing the average distortion evaluation value $d_n$ by the total target distortion evaluation value d is used as the target distortion ratio in Eq. (11), the target distortion ratio may be obtained by substituting the $d_n/d$ into the function $\theta_4$ as expressed by Eq. (29), $$T_{n+1} = T * k * \theta_4\left(\frac{d_n}{d}\right) \quad (29)$$

Eq. (30) is an equation representing the specific example of the function $\theta_4$.

$$\theta_4(x) = \begin{cases} x - b_0 & (x \geq 1 + c_0) \\ a_0 * (x-1)^3 + 1 & (1 + c_0 > x \geq 1) \\ a_1 * (x-1)^3 + 1 & (1 > x \geq 1 - c_1) \\ x + b_1 & (1 - c_1 > x) \end{cases} \quad (30)$$

Figure 6:
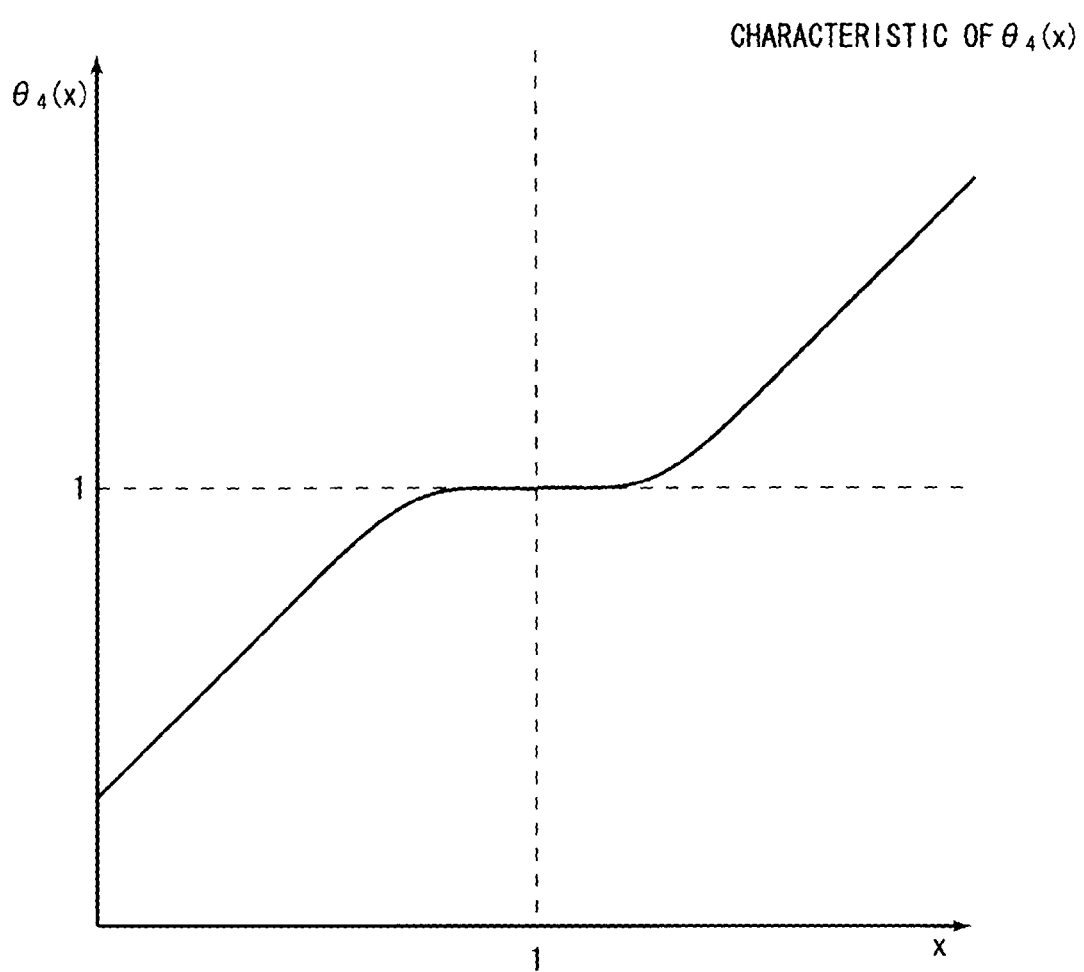
[FIG. 6] is a view showing a characteristic of a function $\theta_4$.

A relation of $a_0$, $a_1$, $b_0$, $b_1$, $c_0$, and $c_1$ in Eq. (30) is expressed by Eq. (31). A characteristic of the function $\theta_4$ represented by such a condition is shown in FIG. 6.

$$a_0 > 0, a_1 > 0 \quad (31)$$
$$c_0 = \frac{1}{\sqrt{3 * a_0}}, c_1 = \frac{1}{\sqrt{3 * a_1}}$$
$$b_0 = \frac{2}{3} * c_0, b_1 = \frac{2}{3} * c_1$$

Thus, the function $\theta_4$ has the characteristic that when an input value is close to "1", an output does not vary significantly from "1". In the specific examples expressed by Eqs. (30) and (31), the output value also significantly varies from the time when the input value becomes larger than ($1+c_0$) or becomes smaller than ($1-c_1$).

By using the function $\theta_4$, it is possible to avoid significant variation of the target setting bit rate $T_{n+1}$ from the total target bit rate T even when the target distortion ratio ($d_n/d$)

deviates a little from "1". In the case where the target distortion ratio relatively largely deviates, by varying the target setting bit rate $T_{n+1}$, it is possible to optimally follow the target.

In the exemplary case shown in FIG. 6, the function $\theta_4$ has the characteristic of bilateral symmetry (point symmetry with respect to the point (1, 1)). The rate of change may be asymmetric with respect to a boundary where the value of the ($d_n/d$) is 1. By increasing $a_0$ and decreasing $a_1$, for example, when the distortion evaluation value becomes larger than the target distortion value (in other words, the image quality is degraded), quick improvement of the image quality can be performed and when the distortion evaluation value becomes smaller than the target distortion value, the bit rate can be controlled to gently increase to the target value.

Though the preferred embodiment in which $d_n/d$ is replaced by $\theta_4(d_n/d)$ in Eq. (11) has been discussed with reference to Eq. (29), similarly, $d_n/d$ may be replaced by $\theta_4(d_n/d)$ in Eqs. (15), (16), (19), and (20) in the second preferred embodiment.

When the distortion evaluation value of the image is larger than the target distortion value (the image quality is degraded as compared with the target quality), adjustment can be made toward the direction to increase the target setting bit rate $T_{n+1}$ at a desired speed by using the function $\theta_4$. It is thereby possible to improve the image quality while maintaining the target bit rate on the whole.

Also in Eqs. (23), (24), (27), and (28) in the third preferred embodiment, $d_n/d$ may be replaced by $\theta_4(d_n/d)$. In this case, however, unlike in the case where the function $\theta_4$ is applied to Eqs. (11), (15), and the like, it is necessary to change the characteristic of the function $\theta_4$ a little by adjusting $a_0$, $a_1$, $b_0$, $b_1$, $c_0$, and $c_1$. This is because $\theta_4(d_n/d)$ is used as a parameter by which the total target bit rate T is multiplied in the case where the function $\theta_4$ is applied to Eqs. (11), (15), and the like but $\theta_4(d_n/d)$ is used as a parameter by which the target rate difference is multiplied in the case where the function $\theta_4$ is applied to Eq. (23) and the like in the third preferred embodiment.

The Fifth Preferred Embodiment

Next, the fifth preferred embodiment of the present invention will be discussed. Also in the fifth preferred embodiment, like in the first to fourth preferred embodiments, the transcoder 1 determines the target setting bit rate $T_{n+1}$ of the second stream in the (n+1) period at the point of time when the n period is finished.

Though the target distortion ratio obtained by dividing the average distortion evaluation value $d_n$ by the total target distortion evaluation value d is used as a parameter in the first to fourth preferred embodiments, a target distortion difference obtained by subtracting the total target distortion evaluation value d from the average distortion evaluation value $d_n$ is used as a parameter in the fifth preferred embodiment.

Eq. (32) is an equation for calculation of the target setting bit rate $T_{n+1}$ in the (n+1) period. The target setting bit rate $T_{n+1}$, is calculated by adding the target distortion difference ($d_n$−d) to the total target bit rate T.

$$T_{n+1} = T + k*(d_n - d) \tag{32}$$

In Eq. (32), "k" is a positive factor and a factor for adjusting the target distortion difference. When the image quality is lower than the target quality and the ($d_n$−d) becomes positive, adjustment is made toward the direction to increase the target setting bit rate $T_{n+1}$ and the image quality is improved. When the image quality is higher than the target quality and the ($d_n$−d) becomes negative, the target setting bit rate $T_{n+1}$ is suppressed. The bit rate by which the target setting bit rate $T_{n+1}$ is suppressed may be allocated later to another control unit time where improvement of the image quality will be needed. When the image quality is higher than the target quality, it is not always necessary to suppress the target setting bit rate $T_{n+1}$.

Though the ($d_n$−d) is added as the target distortion difference to the total target bit rate T (while the factor k is also used as a multiplier) in Eq. (32), the target distortion difference may be obtained by substituting the ($d_n$−d) into a function $\theta_5$ as expressed by Eq. (33). In this case, the target setting bit rate $T_{n+1}$ can be adjusted by multiplying the total target bit rate T by the target distortion difference.

$$T_{n+1} = T*\theta_5(d_n - d) \tag{33}$$

Eq. (34) is an equation representing the specific example of the function $\theta_5$.

$$\theta_5(x) = \begin{cases} x - b_0 + 1 & (x \geq c_0) \\ a_0 * x^3 + 1 & (c_0 > x \geq 0) \\ a_1 * x^3 + 1 & (0 > x \geq -c_1) \\ x + b_1 + 1 & (-c_1 > x) \end{cases} \tag{34}$$

Figure 7:
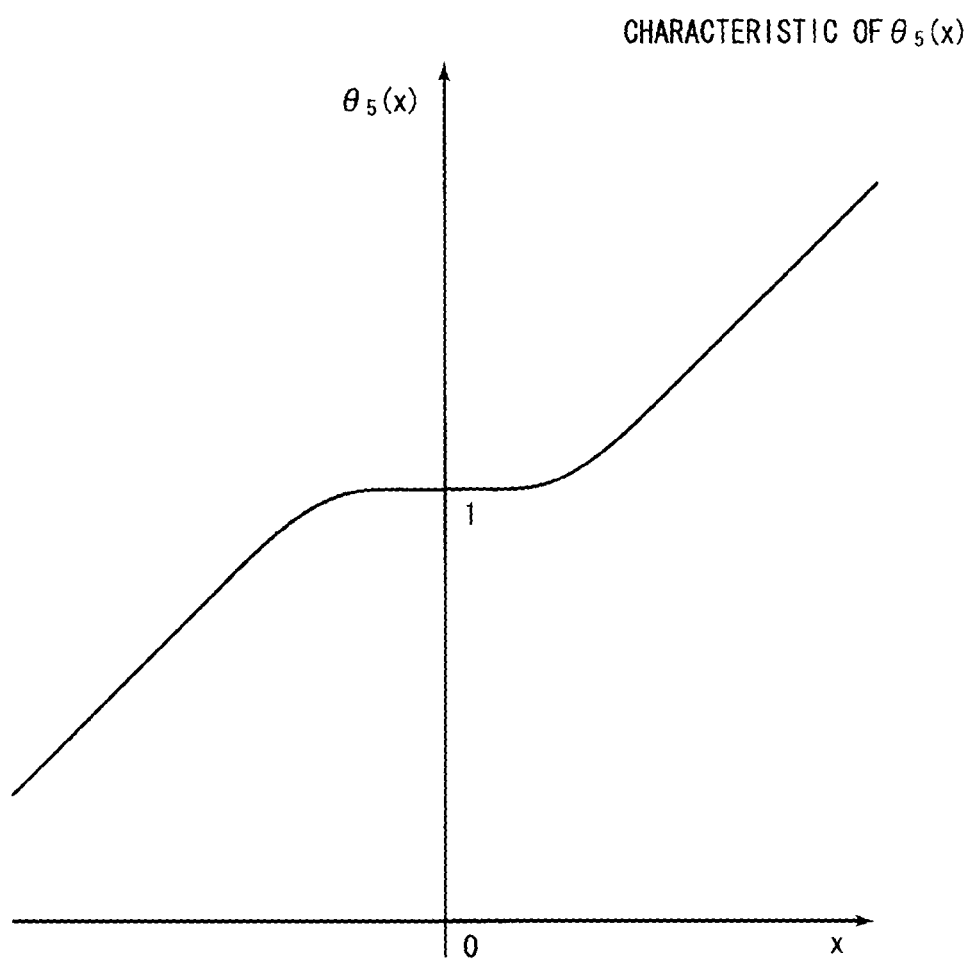
[FIG. 7] is a view showing a characteristic of a function $\theta_5$.

A relation of $a_0$, $a_1$, $b_0$, $b_1$, $c_0$, and $c_1$ in Eq. (34) is expressed by Eq. (35). A characteristic of the function $\theta_5$ represented by such a condition is shown in FIG. 7.

$$a_0 > 0, a_1 > 0 \tag{35}$$

$$c_0 = \frac{1}{\sqrt{3*a_0}}, c_1 = \frac{1}{\sqrt{3*a_1}}$$

$$b_0 = \frac{2}{3}*c_0, b_1 = \frac{2}{3}*c_1$$

Thus, the function $\theta_5$ has the characteristic that when an input value is close to "0", an output does not vary significantly from "1". In the specific examples expressed by Eqs. (34) and (35), the output value also significantly varies from the time when the input value becomes larger than $c_0$ or becomes smaller than $-c_1$.

By using the function $\theta_5$, it is possible to avoid significant variation of the target setting bit rate $T_{n+1}$ from the total target bit rate T even when the ($d_n$−d) deviates a little from "0". In a case where the target distortion difference relatively largely deviates, by varying the target setting bit rate $T_{n+1}$, it is possible to improve the image quality in accordance with the degree of the distortion.

In the exemplary case shown in FIG. 7, the function $\theta_5$ has the characteristic of bilateral symmetry (point symmetry with respect to the point (0, 1)). The rate of change may be asymmetric with respect to a boundary where the value of the ($d_n$−d) is 0. By increasing $a_0$ and decreasing $a_1$, for example, when the average distortion evaluation value $d_n$ becomes larger than the total target distortion evaluation value d, since the image quality is degraded as compared with the target quality, quick improvement of the image quality is performed. In the reverse case where the average distortion evaluation value $d_n$ becomes smaller than the total target distortion evaluation value d, since the image quality is higher than the target quality, the target setting bit rate $T_{n+1}$ is gently suppressed.

Though the value of the $(d_n-d)$ is used as the target distortion difference in Eq. (32), the $(d_n-d)$ may be substituted into a function $\theta_6$ as expressed by Eq. (36).

$$T_{n+1}=T+\theta_6(d_n-d) \quad (36)$$

Eq. (37) is an equation representing the specific example of the function $\theta_6$.

$$\theta_6(x) = \begin{cases} x - b_0 & (x \geq c_0) \\ a_0 * x^3 & (c_0 > x \geq 0) \\ a_1 * x^3 & (0 > x \geq -c_1) \\ x + b_1 & (-c_1 > x) \end{cases} \quad (37)$$

Figure 8:
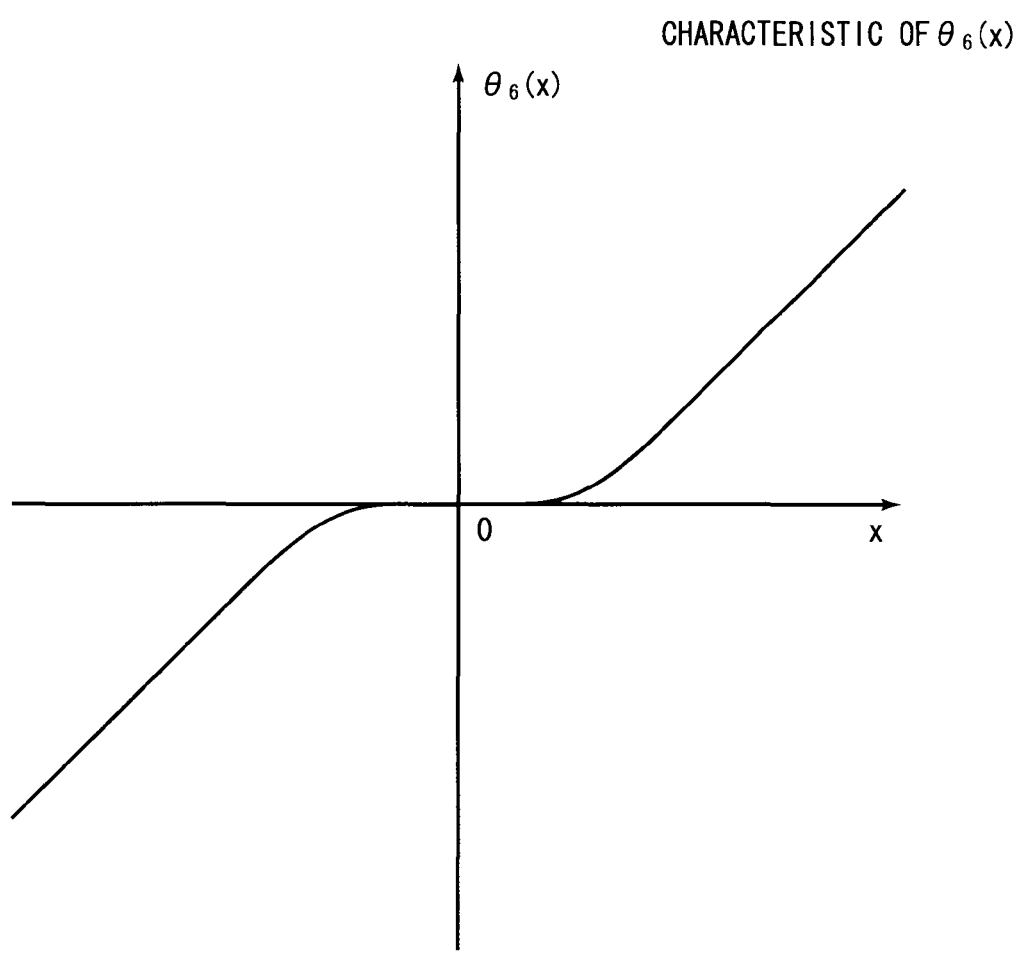
[FIG. 8] is a view showing a characteristic of a function $\theta_6$.

A relation of $a_0$, $a_1$, $b_0$, $b_1$, $c_0$, and $c_1$ in Eq. (37) is expressed by Eq. (38). A characteristic of the function $\theta_6$ represented by such a condition is shown in FIG. 8.

$$a_0 > 0, a_1 > 0 \quad (38)$$
$$c_0 = \frac{1}{\sqrt{3*a_0}}, c_1 = \frac{1}{\sqrt{3*a_1}}$$
$$b_0 = \frac{2}{3}*c_0, b_1 = \frac{2}{3}*c_1$$

Thus, the function $\theta_6$ has the characteristic that when an input value is close to "0", an output does not vary significantly from "0". In the specific examples expressed by Eqs. (37) and (38), the output value also significantly varies from the time when the input value becomes larger than $c_0$ or becomes smaller than $-c_1$.

By using the function $\theta_6$, it is possible to avoid significant variation of the target setting bit rate $T_{n+1}$ from the total target bit rate T even when the $(d_n-d)$ deviates a little from "0". In a case where the target distortion difference relatively largely deviates, by varying the target setting bit rate $T_{n+1}$, it is possible to improve the image quality in accordance with the degree of the distortion.

In the exemplary case shown in FIG. 8, the function $\theta_6$ has the characteristic of bilateral symmetry (point symmetry with respect to the point (0, 0)). The rate of change may be asymmetric with respect to a boundary where the value of the $(d_n-d)$ is 0. By increasing $a_0$ and decreasing $a_1$, for example, when the average distortion evaluation value $d_n$ becomes larger than the total target distortion evaluation value d, since the image quality is degraded as compared with the target quality, quick improvement of the image quality is performed. In the reverse case where the average distortion evaluation value $d_n$ becomes smaller than the total target distortion evaluation value d, since the image quality is higher than the target quality, the target setting bit rate $T_{n+1}$ is gently suppressed.

The Sixth Preferred Embodiment

In the first to fifth preferred embodiments, the average distortion evaluation value $d_n$ is used as a parameter in order to calculate the target setting bit rate $T_{n+1}$. Herein, in the first to fifth preferred embodiments, the average period distortion evaluation value $Ad_n$ may be used, instead of the average distortion evaluation value $d_n$. In Eqs. (11), (12), (15), (16), (19), (20), (23), (24), (27), (28), (29), (32), (33), (36), and the like, the average distortion evaluation value $d_n$ has only to be replaced by the average period distortion evaluation value $Ad_n$.

It is thereby possible to optimally control the target setting bit rate $T_{n+1}$ while gently evaluating the variation of the average distortion evaluation value $d_n$ and improving the image quality, without being affected by local distortion of the image quality.

The Seventh Preferred Embodiment

Figure 9:
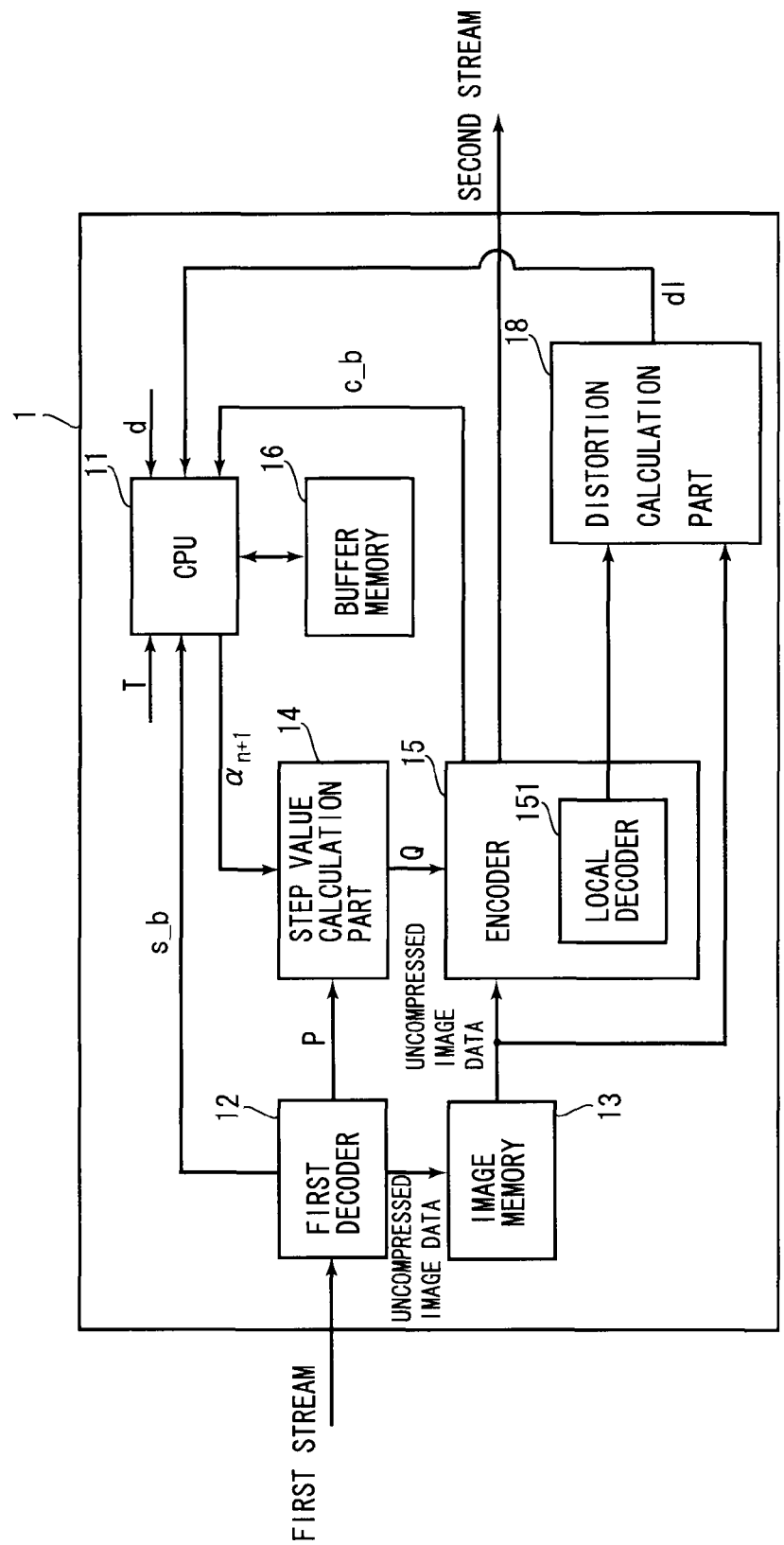
[FIG. 9] is a block diagram showing a transcoder in accordance with a seventh preferred embodiment.

In the transcoder 1 shown in FIG. 1, the second decoder 17 for decoding the second stream outputted from the encoder 15 is separately provided. In the seventh preferred embodiment, as shown in FIG. 9, data outputted from a local decoder 151 in the encoder 15 is outputted to the distortion calculation part 18.

The local decoder 151 is a processing block used to decode again the image data encoded in the encoder 15, to thereby perform interframe prediction. By using the local decoder 151 both for encoding and for calculation of the distortion evaluation value, there is no necessity of separately providing a decoder for calculating the distortion evaluation value and this allows compact device configuration.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A transcoder for converting a first stream into a second stream, comprising:
    a part for setting a target bit rate (T) of a whole second stream;
    a first decoder for obtaining first image data by decoding the first stream;
    an encoder for obtaining the second stream by encoding the first image data;
    a second decoder for obtaining second image data by decoding the second stream;
    a distortion calculation part for calculating a distortion evaluation value based on the first image data and the second image data; and
    a target bit rate determination part for determining a target bit rate ($T_{n+1}$) of a second stream in the (N+1) period based on at least one of (1) a ratio between a distortion evaluation value, which is calculated by the distortion calculation part, of a second stream converted in or before the N period and a target distortion evaluation value (d) of said whole second stream, and (2) a difference between the distortion evaluation value, which is calculated by the distortion calculation part, of the second stream converted in or before the N period and the target distortion evaluation value (d) of said whole second stream.

2. The transcoder according to claim 1, wherein assuming that a value calculated based on said ratio between said distortion evaluation value of said second stream converted in or before the N period and said target distortion evaluation value (d) of said whole second stream is determined as a target distortion ratio, said target bit rate determination part calculates said target bit rate ($T_{n+1}$) of said second stream in the (N+1) period by multiplying said target bit rate (T) of said whole second stream by said target distortion ratio.

3. The transcoder according to claim 1, wherein assuming that a value calculated based on said ratio between said distortion evaluation value of said second stream converted in or before the N period and said target distortion evaluation value (d) of said whole second stream is determined as a target distortion ratio, said target bit rate determination part calculates said target bit rate ($T_{n+1}$) of said second stream in the (N+1) period by adding said target distortion ratio to said target bit rate (T) of said whole second stream.

4. The transcoder according to claim 1, wherein assuming that a value calculated based on said difference between said distortion evaluation value of said second stream converted in or before the N period and said target distortion evaluation value (d) of said whole second stream is determined as a target distortion difference, said target bit rate determination part calculates said target bit rate ($T_{n+1}$) of said second stream in the (N+1) period by adding said target distortion difference to said target bit rate (T) of said whole second stream.

5. The transcoder according to claim 1, wherein assuming that a value calculated based on said difference between said distortion evaluation value of said second stream converted in or before the N period and said target distortion evaluation value (d) of said whole second stream is determined as a target distortion difference, said target bit rate determination part calculates said target bit rate ($T_{n+1}$) of said second stream in the (N+1) period by multiplying said target bit rate (T) of said whole second stream by said target distortion difference.

6. The transcoder according to claim 1, wherein said target bit rate determination part determines the target bit rate ($T_{n+1}$) of the second stream in the (N+1) period based on a bit rate of the second stream converted in or before the N period, and a target bit rate ($T_n$) of the second stream in the N period.

7. The transcoder according to claim 6, wherein
assuming that a value calculated based on said ratio between said distortion evaluation value of said second stream converted in or before the N period and said target distortion evaluation value (d) of said whole second stream is determined as a target distortion ratio and a value calculated based on a ratio between said bit rate of said second stream converted in or before the N period and said target bit rate ($T_n$) of said second stream in the n period is determined as a target rate ratio,
said target bit rate determination part calculates said target bit rate ($T_{n+1}$) of said second stream in the (N+1) period by multiplying a ratio between said target bit rate (T) of said whole second stream and said target rate ratio by said target distortion ratio.

8. The transcoder according to claim 7, wherein assuming that a ratio between a bit rate ($S_{n-1}$) of a first stream in the (N−1) period and a bit rate ($S_n$) of a first stream in the N period is determined as a period ratio, said target bit rate determination part adjusts said target rate ratio by multiplying said target rate ratio by said period ratio.

9. The transcoder according to claim 7, wherein assuming that a ratio between a bit rate ($S_n$) of a first stream in the N period and a bit rate ($S_{n+1}$) of a first stream in the (N+1) period is determined as a period ratio, said target bit rate determination part adjusts said target rate ratio by multiplying said target rate ratio by said period ratio.

10. The transcoder according to claim 7, wherein assuming that a ratio between an average bit rate ($AS_{n-1}$) of first streams in a plurality of past periods including the (N−1) period and an average bit rate ($AS_n$) of first streams in a plurality of past periods including the N period is determined as a period ratio, said target bit rate determination part adjusts said target rate ratio by multiplying said target rate ratio by said period ratio.

11. The transcoder according to claim 7, wherein assuming that a ratio between an average bit rate ($AS_n$) of first streams in a plurality of past periods including the N period and an average bit rate ($AS_{n+1}$) of first streams in a plurality of past periods including the (N+1) period is determined as a period ratio, said target bit rate determination part adjusts said target rate ratio by multiplying said target rate ratio by said period ratio.

12. The transcoder according to claim 6, wherein
assuming that a value calculated based on said ratio between said distortion evaluation value of said second stream converted in or before the N period and said target distortion evaluation value (d) of said whole second stream is determined as a target distortion ratio and a value calculated based on a difference between said target bit rate ($T_n$) of said second stream in the n period and said bit rate of said second stream converted in or before the N period is determined as a target rate difference,
said target bit rate determination part calculates said target bit rate ($T_{n+1}$) of said second stream in the (N+1) period by adding a product of said target rate difference and said target distortion ratio to said target bit rate (T) of said whole second stream.

13. The transcoder according to claim 12, wherein assuming that a ratio between a bit rate ($S_n$) of a first stream in the N period and a bit rate ($S_{n-1}$) of a first stream in the (N−1) period is determined as a period ratio, said target bit rate determination part adjusts said target rate difference by multiplying said target rate difference by said period ratio.

14. The transcoder according to claim 12, wherein assuming that a ratio between a bit rate ($S_{n+1}$) of a first stream in the (N+1) period and a bit rate ($S_n$) of a first stream in the N period is determined as a period ratio, said target bit rate determination part adjusts said target rate difference by multiplying said target rate difference by said period ratio.

15. The transcoder according to claim 12, wherein assuming that a ratio between an average bit rate ($AS_n$) of first streams in a plurality of past periods including the N period and an average bit rate ($AS_{n-1}$) of first streams in a plurality of past periods including the (N−1) period is determined as a period ratio, said target bit rate determination part adjusts said target rate difference by multiplying said target rate difference by said period ratio.

16. The transcoder according to claim 12, wherein assuming that a ratio between an average bit rate ($AS_{n+1}$) of first streams in a plurality of past periods including the (N+1) period and an average bit rate ($AS_n$) of first streams in a plurality of past periods including the N period is determined as a period ratio, said target bit rate determination part adjusts said target rate difference by multiplying said target rate difference by said period ratio.

17. The transcoder according to claim 6, wherein a bit rate ($C_n$) of said second stream in the N period is used as said bit rate of said second stream converted in or before the N period.

18. The transcoder according to claim 6, wherein an average bit rate ($AC_n$) of second streams in a plurality of past periods including the N period is used as said bit rate of said second stream converted in or before the N period.

19. The transcoder according to claim 1 wherein a distortion evaluation value ($d_n$) of said second stream in the N period is used as said distortion evaluation value of said second stream converted in or before the N period.

20. The transcoder according to claim 1, wherein an average distortion evaluation value ($Ad_n$) of second streams in a plurality of past periods including the N period is used as said distortion evaluation value of said second stream converted in or before the N period.

21. The transcoder according to claim 1, wherein said distortion evaluation value of said second stream is calculated based on a sum of squared differences of an image obtained by decoding said first stream and an image obtained by decoding said second stream.

22. The transcoder according to claim 1, wherein said distortion evaluation value of said second stream is calculated based on a sum of absolute differences of an image obtained by decoding said first stream and an image obtained by decoding said second stream.

23. The transcoder according to claim 1, further comprising:
 a part for calculating a quantization step conversion factor ($\alpha_{n+1}$) in the (N+1) period based on a ratio between said target bit rate ($T_{n+1}$) of said second stream in the (N+1) period which is determined by said target bit rate determination part and a bit rate of a first stream in or before the N period; and
 a part for calculating a quantization step value of said second stream in the (N+1) period by multiplying a quantization step value of a first stream in the (N+1) period by said quantization step conversion factor ($\alpha_{n+1}$) in the (N+1) period.

24. The transcoder according to claim 1, further comprising:
 a part for calculating a quantization step conversion factor ($\alpha_{n+1}$) in the (N+1) period based on a ratio between said target bit rate ($T_{n+1}$) of said second stream in the (N+1) period which is determined by said target bit rate determination part and a bit rate of a first stream in or before the (N+1) period; and
 a part for calculating a quantization step value of said second stream in the (N+1) period by multiplying a quantization step value of a first stream in the (N+1) period by said quantization step conversion factor ($\alpha_{n+1}$) in the (N+1) period.

25. The transcoder according to claim 2, wherein the rate of change in said calculated target distortion ratio is asymmetric with respect to a boundary where said ratio between said distortion evaluation value of said second stream converted in or before the N period and said target distortion evaluation value (d) of said whole second stream is 1.

26. The transcoder according to claim 4, wherein the rate of change in said calculated target distortion difference is asymmetric with respect to a boundary where said difference between said distortion evaluation value of said second stream converted in or before the N period and said target distortion evaluation value (d) of said whole second stream is 0.

27. The transcoder according to claim 21, wherein a local decoder in an encoder is used as a processing part for decoding said second stream in order to calculate said distortion evaluation value of said second stream.

28. The transcoder according to claim 22, wherein a local decoder in an encoder is used as a processing part for decoding said second stream in order to calculate said distortion evaluation value of said second stream.

* * * * *